United States Patent
Zewail et al.

(10) Patent No.: US 12,213,148 B2
(45) Date of Patent: Jan. 28, 2025

(54) GRANT-BASED FEEDBACK BIT DETERMINATION FOR FEEDBACK OCCASIONS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 378 days.

(21) Appl. No.: 17/709,308

(22) Filed: Mar. 30, 2022

(65) Prior Publication Data

US 2022/0330311 A1 Oct. 13, 2022

Related U.S. Application Data

(60) Provisional application No. 63/171,050, filed on Apr. 5, 2021.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04W 72/1268* (2013.01); *H04W 72/21* (2023.01)

(58) Field of Classification Search
CPC . H04W 72/23; H04W 72/1268; H04W 72/21; H04L 5/0053; H04L 1/1864;
(Continued)

(56) References Cited

U.S. PATENT DOCUMENTS

2018/0302128 A1* 10/2018 Akkarakaran ....... H04B 7/0421
2019/0166597 A1* 5/2019 Xiong .................. H04L 1/1812
2022/0167320 A1* 5/2022 Lee ...................... H04W 72/23

FOREIGN PATENT DOCUMENTS

WO  WO-2020204486 A1  10/2020

OTHER PUBLICATIONS

International Search Report and Written Opinion—PCT/US2022/022862—ISA/EPO—Jul. 5, 2022 (2103785WO).
(Continued)

*Primary Examiner* — Shailendra Kumar
(74) *Attorney, Agent, or Firm* — Holland & Hart LLP

(57) ABSTRACT

Methods, systems, and devices for wireless communications are described. A base station may transmit a feedback configuration to a user equipment (UE) in control signaling, such as radio resource control (RRC) signaling, a medium access control (MAC) control element (MAC-CE), or a downlink control information (DCI) message. The feedback configuration may indicate a number of feedback bits to provide for each grant within a feedback occasion. The UE may receive scheduling information indicating one or more grants for the UE within the feedback occasion. The UE may transmit a feedback message based on receiving the grants, where the feedback message includes a set of bits for each grant within the feedback occasion. The number of bits in the set may be based on the feedback configuration.

30 Claims, 17 Drawing Sheets

(51) Int. Cl.
*H04W 72/1268* (2023.01)
*H04W 72/21* (2023.01)

(58) Field of Classification Search
CPC ..... H04L 5/0055; H04L 5/001; H04L 5/0094; H04B 7/0695
See application file for complete search history.

(56) References Cited

OTHER PUBLICATIONS

QUALCOMM Incorporated, "PDSCH and PUSCH Enhancements for 52.6-71GHz Band", 3GPP TSG-RAN WGI #106e, Aug. 16-27, 2021, R1-2107334, 24 pages.

* cited by examiner

Feedback Configuration 230

Downlink Transmission(s) 245

Grant(s) 240

Feedback Message 250

DAI 242

GRANT-BASED FEEDBACK BIT DETERMINATION FOR FEEDBACK OCCASIONS

CROSS REFERENCE

The present application for patent claims the benefit of U.S. Provisional Patent Application No. 63/171,050 by ZEWAIL et al., entitled "GRANT-BASED FEEDBACK BIT DETERMINATION FOR FEEDBACK OCCASIONS," filed Apr. 5, 2021, assigned to the assignee hereof, and expressly incorporated by reference in its entirety herein.

INTRODUCTION

The following relates to wireless communications, including flexible feedback during feedback occasions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a network device, a feedback configuration indicating a number of feedback bits to provide for each grant within a feedback occasion associated with the UE, receiving one or more grants for the UE within the feedback occasion, and transmitting, based on the receiving the one or more grants for the UE, a feedback message that includes a respective set of bits for each respective grant of the one or more grants within the feedback occasion, each respective set of bits having a number of bits corresponding to the number of feedback bits indicated by the feedback configuration.

An apparatus for wireless communications at a UE is described. The apparatus may include a processor, and memory coupled with the processor, the processor configured to receive, from a network device, a feedback configuration indicating a number of feedback bits to provide for each grant within a feedback occasion associated with the UE, receive one or more grants for the UE within the feedback occasion, and transmit, based on the receiving the one or more grants for the UE, a feedback message that includes a respective set of bits for each respective grant of the one or more grants within the feedback occasion, each respective set of bits having a number of bits corresponding to the number of feedback bits indicated by the feedback configuration.

Another apparatus for wireless communications at a UE is described. The apparatus may include means for receiving, from a network device, a feedback configuration indicating a number of feedback bits to provide for each grant within a feedback occasion associated with the UE, means for receiving one or more grants for the UE within the feedback occasion, and means for transmitting, based on the receiving the one or more grants for the UE, a feedback message that includes a respective set of bits for each respective grant of the one or more grants within the feedback occasion, each respective set of bits having a number of bits corresponding to the number of feedback bits indicated by the feedback configuration.

A non-transitory computer-readable medium storing code for wireless communications at a UE is described. The code may include instructions executable by a processor to receive, from a network device, a feedback configuration indicating a number of feedback bits to provide for each grant within a feedback occasion associated with the UE, receive one or more grants for the UE within the feedback occasion, and transmit, based on the receiving the one or more grants for the UE, a feedback message that includes a respective set of bits for each respective grant of the one or more grants within the feedback occasion, each respective set of bits having a number of bits corresponding to the number of feedback bits indicated by the feedback configuration.

A method for wireless communications at a UE is described. The method may include receiving, from a base station, a feedback configuration indicating a number of feedback bits to provide for each grant within a feedback occasion associated with the UE, receiving one or more grants for the UE within the feedback occasion, and transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

An apparatus for wireless communications at a UE is described. The apparatus may include a processor, and memory coupled with the processor, the processor and memory configured to cause the apparatus to receive, from a base station, a feedback configuration indicating a number of feedback bits to provide for each grant within a feedback occasion associated with the UE, receive one or more grants for the UE within the feedback occasion, and transmit, based on receiving the one or more grants for the UE, a feedback message that includes a respective set of bits for each of the one or more grants within the feedback occasion, each respective set of bits having a number of bits corresponding to the number of feedback bits indicated by the feedback configuration.

Another apparatus for wireless communications at a UE is described. The apparatus may include means for receiving, from a base station, a feedback configuration indicating a number of feedback bits to provide for each grant within a feedback occasion associated with the UE, means for receiving one or more grants for the UE within the feedback occasion, and means for transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

A non-transitory computer-readable medium storing code for wireless communications at a UE is described. The code may include instructions executable by a processor to receive, from a base station, a feedback configuration indicating a number of feedback bits to provide for each grant within a feedback occasion associated with the UE, receive one or more grants for the UE within the feedback occasion, and transmit, based on receiving the one or more grants for the UE, a feedback message that includes a respective set of bits for each of the one or more grants within the feedback occasion, each respective set of bits having a number of bits corresponding to the number of feedback bits indicated by the feedback configuration.

In some examples of the method, apparatuses, and non-transitory computer-readable medium described herein, receiving the feedback configuration may include operations, features, means, or instructions for receiving control signaling associated with a radio resource control (RRC) configuration or a medium access control (MAC) control element (MAC-CE), the control signaling including the feedback configuration indicating the number of feedback bits.

Some examples of the method, apparatuses, and non-transitory computer-readable medium described herein may further include operations, features, means, or instructions for monitoring for a number of downlink shared channel transmissions scheduled by a grant of the one or more grants, where the number of downlink shared channel transmissions may be less than the number of feedback bits to provide for the each grant, where the feedback message includes a set of bits including a first set of feedback bits for the number of downlink shared channel transmissions and one or more zero value bits.

Some examples of the method, apparatuses, and non-transitory computer-readable medium described herein may further include operations, features, means, or instructions for refraining from using one or more codebooks corresponding to the number of downlink shared channel transmissions based on a first size of a first feedback codebook corresponding to the set of bits for the grant being equal to a second size of a second feedback codebook corresponding to a second set of bits for a second grant.

Some examples of the method, apparatuses, and non-transitory computer-readable medium described herein may further include operations, features, means, or instructions for monitoring for a number of downlink shared channel transmissions scheduled by a grant of the one or more grants, where the number of downlink shared channel transmissions may be greater than the number of feedback bits to provide for the each grant and bundling one or more feedback bits associated with the number of downlink shared channel transmissions according to a bundling pattern, where the feedback message includes the bundled one or more feedback bits.

Some examples of the method, apparatuses, and non-transitory computer-readable medium described herein may further include operations, features, means, or instructions for receiving an indication of the bundling pattern, where the control signaling includes the indication.

In some examples of the method, apparatuses, and non-transitory computer-readable medium described herein, receiving the feedback configuration may include operations, features, means, or instructions for receiving a downlink control channel that includes the feedback configuration.

Some examples of the method, apparatuses, and non-transitory computer-readable medium described herein may further include operations, features, means, or instructions for receiving a control message that schedules a single downlink shared channel transmission within the feedback occasion, where the feedback configuration indicates the number of feedback bits to provide for the single downlink shared channel transmission.

In some examples of the method, apparatuses, and non-transitory computer-readable medium described herein, the number of feedback bits to provide for the each grant within the feedback occasion associated with the UE indicated in the feedback configuration may be based on a first size of a first feedback codebook being equal to a second size of a second feedback codebook.

Some examples of the method, apparatuses, and non-transitory computer-readable medium described herein may further include operations, features, means, or instructions for receiving a grant of the one or more grants, the grant indicating that at least one grant may have been unsuccessfully received at the UE and transmitting a set of feedback bits for the at least one grant in the feedback message, the set of feedback bits includes a set of zero value bits equal to the number of feedback bits indicated by the feedback configuration.

Some examples of the method, apparatuses, and non-transitory computer-readable medium described herein may further include operations, features, means, or instructions for receiving a grant of the one or more grants, the grant scheduling a number of downlink shared channel transmissions that may be less than the number of feedback bits indicated by the feedback configuration and repeating at least one bit of a set of feedback bits for the number of downlink shared channel transmissions in the feedback message the number of downlink shared channel transmissions being less than the number of feedback bits indicated by the feedback configuration.

In some examples of the method, apparatuses, and non-transitory computer-readable medium described herein, the number of feedback bits may be different from a second number of feedback bits to provide for the each grant within a second feedback occasion associated with the UE.

A method for wireless communications at a network device is described. The method may include transmitting one or more grants within a feedback occasion associated with the UE and receiving a feedback message that includes a respective set of bits for each respective grant of the one or more grants within the feedback occasion, each respective set of bits having a number of bits corresponding to a number of feedback bits.

An apparatus for wireless communications at a network device is described. The apparatus may include a processor and memory coupled with the processor, the processor configured to transmit one or more grants within a feedback occasion associated with a UE and receive a feedback message that includes a respective set of bits for each respective grant of the one or more grants within the feedback occasion, each respective set of bits having a number of bits corresponding to a number of feedback bits.

Another apparatus for wireless communications at a network device is described. The apparatus may include means for transmitting one or more grants within a feedback occasion associated with a UE and means for receiving a feedback message that includes a respective set of bits for each respective grant of the one or more grants within the feedback occasion, each respective set of bits having a number of bits corresponding to a number of feedback bits.

A non-transitory computer-readable medium storing code for wireless communications at a network device is described. The code may include instructions executable by a processor to transmit one or more grants within a feedback occasion associated with a UE and receive a feedback message that includes a respective set of bits for each respective grant of the one or more grants within the feedback occasion, each respective set of bits having a number of bits corresponding to a number of feedback bits.

Some examples of the method, apparatuses, and non-transitory computer-readable medium described herein may further include operations, features, means, or instructions for transmitting a feedback configuration indicating the number of feedback bits to provide for each grant within the feedback occasion.

In some examples of the method, apparatuses, and non-transitory computer-readable medium described herein, transmitting the feedback configuration may include operations, features, means, or instructions for transmitting control signaling associated with an RRC configuration or a MAC-CE, the control signaling including the feedback configuration indicating the number of feedback bits.

Some examples of the method, apparatuses, and non-transitory computer-readable medium described herein may further include operations, features, means, or instructions for transmitting a number of downlink shared channel transmissions scheduled by a grant of the one or more grants, where the number of downlink shared channel transmissions may be less than the number of feedback bits to provide for the each grant, where the feedback message includes a set of bits including a first set of feedback bits for the number of downlink shared channel transmissions and one or more zero value bits.

Some examples of the method, apparatuses, and non-transitory computer-readable medium described herein may further include operations, features, means, or instructions for transmitting a number of downlink shared channel transmissions scheduled by a grant of the one or more grants, where the number of downlink shared channel transmissions may be greater than the number of feedback bits to provide for the each grant and receiving one or more feedback bits associated with the number of downlink shared channel transmissions according to a bundling pattern, where the feedback message includes one or more bundled feedback bits.

Some examples of the method, apparatuses, and non-transitory computer-readable medium described herein may further include operations, features, means, or instructions for transmitting an indication of the bundling pattern, where the control signaling includes the indication.

In some examples of the method, apparatuses, and non-transitory computer-readable medium described herein, transmitting the feedback configuration may include operations, features, means, or instructions for transmitting a downlink control channel that includes the feedback configuration.

Some examples of the method, apparatuses, and non-transitory computer-readable medium described herein may further include operations, features, means, or instructions for transmitting a control message that schedules a single downlink shared channel transmission within the feedback occasion, where the feedback configuration indicates the number of feedback bits to provide for the single downlink shared channel transmission.

Some examples of the method, apparatuses, and non-transitory computer-readable medium described herein may further include operations, features, means, or instructions for receiving a set of feedback bits for at least one grant unsuccessfully received at the UE in the feedback message, the set of feedback bits includes a set of zero value bits equal to the number of feedback bits indicated by the feedback configuration.

Some examples of the method, apparatuses, and non-transitory computer-readable medium described herein may further include operations, features, means, or instructions for transmitting a grant of the one or more grants, the grant scheduling a number of downlink shared channel transmissions that may be less than the number of feedback bits indicated by the feedback configuration and receiving a repetition of at least one bit of a set of feedback bits for the number of downlink shared channel transmissions in the feedback message, the number of downlink shared channel transmissions being less than the number of feedback bits indicated by the feedback configuration.

A method for wireless communications at a base station is described. The method may include transmitting, to a UE, a feedback configuration indicating a number of feedback bits to provide for each grant within a feedback occasion associated with the UE, transmitting, to the UE, one or more grants within the feedback occasion, and receiving a feedback message that includes a respective set of bits for each of the one or more grants within the feedback occasion, each respective set of bits having a number of bits corresponding to the number of feedback bits indicated by the feedback configuration.

An apparatus for wireless communications at a base station is described. The apparatus may include a processor, memory coupled with the processor, and instructions stored in the memory. The instructions may be executable by the processor to cause the apparatus to transmit, to a UE, a feedback configuration indicating a number of feedback bits to provide for each grant within a feedback occasion associated with the UE, transmit, to the UE, one or more grants within the feedback occasion, and receive a feedback message that includes a respective set of bits for each of the one or more grants within the feedback occasion, each respective set of bits having a number of bits corresponding to the number of feedback bits indicated by the feedback configuration.

Another apparatus for wireless communications at a base station is described. The apparatus may include means for transmitting, to a UE, a feedback configuration indicating a number of feedback bits to provide for each grant within a feedback occasion associated with the UE, means for transmitting, to the UE, one or more grants within the feedback occasion, and means for receiving a feedback message that includes a respective set of bits for each of the one or more grants within the feedback occasion, each respective set of bits having a number of bits corresponding to the number of feedback bits indicated by the feedback configuration.

A non-transitory computer-readable medium storing code for wireless communications at a base station is described. The code may include instructions executable by a processor to transmit, to a UE, a feedback configuration indicating a number of feedback bits to provide for each grant within a feedback occasion associated with the UE, transmit, to the UE, one or more grants within the feedback occasion, and receive a feedback message that includes a respective set of bits for each of the one or more grants within the feedback occasion, each respective set of bits having a number of bits corresponding to the number of feedback bits indicated by the feedback configuration.

In some examples of the method, apparatuses, and non-transitory computer-readable medium described herein, transmitting the feedback configuration may include operations, features, means, or instructions for transmitting control signaling associated with an RRC configuration or a MAC-CE, the control signaling including the feedback configuration indicating the number of feedback bits.

Some examples of the method, apparatuses, and non-transitory computer-readable medium described herein may further include operations, features, means, or instructions for transmitting, to the UE, a number of downlink shared channel transmissions scheduled by a grant of the one or more grants, where the number of downlink shared channel transmissions may be less than the number of feedback bits to provide for the each grant, where the feedback message includes a set of bits including a first set of feedback bits for the number of downlink shared channel transmissions and one or more zero value bits.

Some examples of the method, apparatuses, and non-transitory computer-readable medium described herein may further include operations, features, means, or instructions for transmitting, to the UE, a number of downlink shared channel transmissions scheduled by a grant of the one or more grants, where the number of downlink shared channel transmissions may be greater than the number of feedback bits to provide for the each grant and receiving one or more feedback bits associated with the number of downlink shared channel transmissions according to a bundling pattern, where the feedback message includes one or more bundled feedback bits.

Some examples of the method, apparatuses, and non-transitory computer-readable medium described herein may further include operations, features, means, or instructions for transmitting an indication of the bundling pattern, where the control signaling includes the indication.

In some examples of the method, apparatuses, and non-transitory computer-readable medium described herein, transmitting the feedback configuration may include operations, features, means, or instructions for transmitting a downlink control channel that includes the feedback configuration.

Some examples of the method, apparatuses, and non-transitory computer-readable medium described herein may further include operations, features, means, or instructions for transmitting a control message that schedules a single downlink shared channel transmission within the feedback occasion, where the feedback configuration indicates the number of feedback bits to provide for the single downlink shared channel transmission.

Some examples of the method, apparatuses, and non-transitory computer-readable medium described herein may further include operations, features, means, or instructions for receiving a set of feedback bits for at least one grant unsuccessfully received at the UE in the feedback message, the set of feedback bits includes a set of zero value bits equal to the number of feedback bits indicated by the feedback configuration.

Some examples of the method, apparatuses, and non-transitory computer-readable medium described herein may further include operations, features, means, or instructions for transmitting a grant of the one or more grants, the grant scheduling a number of downlink shared channel transmissions that may be less than the number of feedback bits indicated by the feedback configuration and receiving a repetition of at least one bit of a set of feedback bits for the number of downlink shared channel transmissions in the feedback message, the number of downlink shared channel transmissions being less than the number of feedback bits indicated by the feedback configuration.

DETAILED DESCRIPTION

Figure 1:
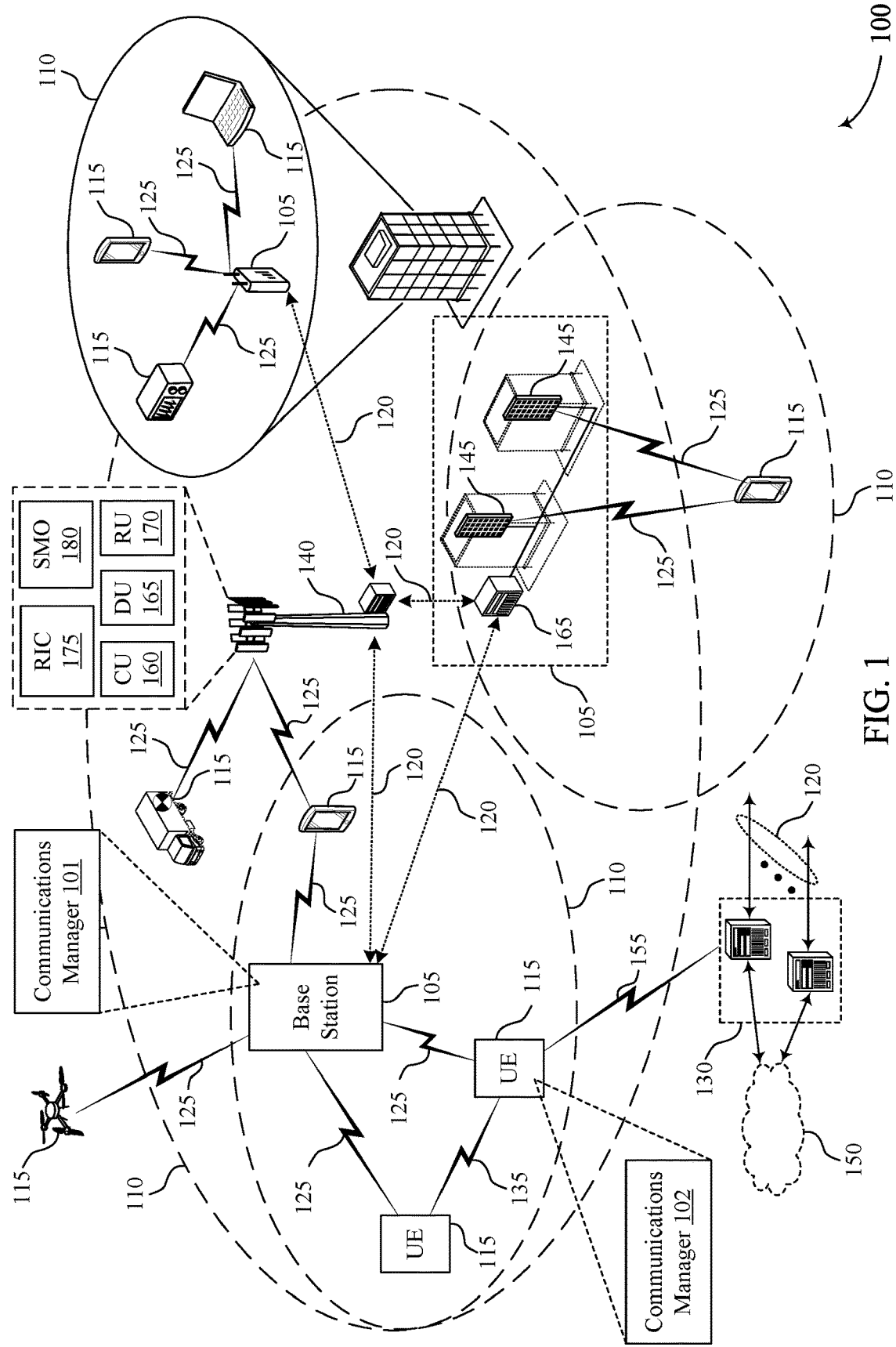
FIGS. 1 and 2 illustrate examples of wireless communications systems that support grant-based feedback bit determination for feedback occasions in accordance with one or more aspects of the present disclosure.

In some wireless communications systems, a network device, or base station, may schedule communications (e.g., uplink transmissions and downlink receptions) for a UE or group of UEs using control information, such as a downlink control information (DCI) message. For example, the network device, which may also be referred to as a base station, may transmit the DCI to a UE, and the DCI may include one or more grants scheduling downlink shared channel data transmissions for the UE. In some examples, the base station may schedule one or more feedback messages for the UE, such as a positive acknowledgment (ACK) message or a negative acknowledgement (NACK) message, which may be transmitted by the UE in response to the downlink shared channel data transmissions. During transmission of the feedback, the UE may generate a codebook, which may be a matrix that transforms a data bit to another set of data that maps to each antenna port of the UE, based on the DCI. In some examples, the UE may count one or more downlink assignment indices (DAIs), which may point to a scheduled downlink shared channel data transmission that is bundled to or associated with a feedback transmission. In some examples, the DAI may be a field in DCI that indicates an index of a downlink resource assignment (e.g., a downlink channel assignment). The UE may count DAIs per DCI, per downlink shared channel data transmission, or based on a factor of downlink shared channel data transmissions (every 2, 3, 4, etc.). To avoid a mismatch of codebook size, the number of feedback bits for each DCI message may be fixed, which may affect the flexibility of scheduling or feedback bits in the codebook. For example, the mismatch of codebook size may increase usage of feedback bits in the codebook, increase rigidity of scheduling feedback bits, or both.

As described herein, a UE may receive a feedback configuration from a base station that indicates feedback bits for each grant scheduling downlink transmissions within a feedback occasion (e.g., a duration dedicated to a feedback transmission). The feedback configuration for the feedback occasion may include respective sets of bits for each downlink transmission of the feedback occasions and each set of bits may have a same number of bits, which may reduce signaling overhead and latency related to retransmission by adjusting the number of feedback bits according to a flexible scheme. In some cases, a base station may schedule one or more downlink shared channel transmissions via one or more scheduling grants, such as downlink shared channel (e.g., physical downlink shared channel (PDSCH)) grants. The base station may schedule corresponding feedback messages for each grant at the UE, such that the UE may use the feedback message for each grant rather than counting DAIs. For example, the base station may send a configuration for a number of feedback bits per grant.

The configuration signaling may allow the base station to flexibly configure the number of feedback bits from one feedback occasion to another, which may increase resource allocation efficiency by using each feedback bit in a codebook. In some examples, the base station may send the configuration to the UE via RRC signaling, a MAC-CE, or the like. In some cases, if the number of downlink shared channel transmissions for a grant within a feedback occasion is less than the number of feedback bits assigned to the grant, then the UE may use zero-padding to transmit the feedback message such that the codebook size for each grant may be the same to prevent wasted resources. In some other cases, if the number of downlink shared channel transmissions for the grant is greater than the number of feedback bits assigned to the grants within the feedback occasion, the UE may bundle together one or more of the downlink shared channel transmissions according to a bundling pattern. The bundling pattern may be configured by the base station. The UE may bundle the downlink shared channel transmissions to increase resource allocation efficiency.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to grant-based feedback bit determination for feedback occasions.

FIG. 1 illustrates an example of a wireless communications system 100 that supports grant-based feedback bit determination for feedback occasions in accordance with one or more aspects of the present disclosure. The wireless communications system 100 may include one or more base stations 105, such as one or more network devices 140, which may also be referred to as network entities, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105, network devices 140, or both may be dispersed throughout a geographic area to form the wireless communications system 100 and may be devices in different forms or having different capabilities. The base stations 105, network devices 140, or both and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, network devices 140, or network equipment (e.g., core network nodes, relay devices, integrated access and backhaul (IAB) nodes, or other network equipment), as shown in FIG. 1.

The base stations 105, network devices 140, or both may communicate with the core network 130, or with one another, or both. For example, the base stations 105, network devices 140, or both may interface with the core network 130 through one or more backhaul links 120 (e.g., via an S1, N2, N3, or other interface). The base stations 105, network devices 140, or both may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

As described herein, a node, which may be referred to as a node, a network node, a network device 140, a network entity, or a wireless node, may be a base station 105 (e.g., any base station described herein), a UE 115 (e.g., any UE described herein), a network controller, an apparatus, a device, a computing system, one or more components, and/or another suitable processing entity configured to perform any of the techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different relative to these examples. Similarly, reference to a UE 115, base station 105, apparatus, device, computing system, or the like may include disclosure of the UE 115, base station 105, apparatus, device, computing system, or the like being a network node. For example, disclosure that a UE 115 is configured to receive information from a base station 105 also discloses that a first network node is configured to receive information from a second network node. Consistent with this disclosure, once a specific example is broadened in accordance with this disclosure (e.g., a UE 115 is configured to receive information from a base station 105 also discloses that a first network node is configured to receive information from a second network node), the broader example of the narrower example may be interpreted in the reverse, but in a broad open-ended way. In the example above where a UE 115 being configured to receive information from a base station 105 also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, a network device 140 may be implemented in a disaggregated architecture (e.g., a disaggregated base station architecture, a disaggregated RAN architecture), which may be configured to utilize a protocol stack that is physically or logically distributed among two or more network devices 140, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network device 140 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network devices 105 in a disaggregated RAN architecture may be co-located, or one or more components of the network devices 105 may be located in distributed locations (e.g., separate physical locations). In some examples, one or more network devices 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network devices 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network devices 105 (e.g., IAB nodes) may be partially controlled by each other. One or more IAB nodes may be referred to as a donor entity or an IAB donor. One or more DUs 165 or one or more RUs 170 may be partially controlled by one or more CUs 160 associated with a donor network device 140 (e.g., a donor base station 105). The one or more donor network devices 140 (e.g., IAB donors) may be in communication with one or more additional network devices 105 (e.g., IAB nodes) via supported access and backhaul links (e.g., backhaul communication links 120). IAB nodes may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node used for access via the DU 165 of the IAB node (e.g., referred to as virtual IAB-MT (vIAB-MT)). In some examples, the IAB nodes may include DUs 165 that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

For instance, an access network (AN) or RAN may include communications between access nodes (e.g., an IAB donor), IAB nodes, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node may refer to a RAN node that provides IAB functionality (e.g., access for UEs 115, wireless self-backhauling capabilities). A DU 165 may act as a distributed scheduling node towards child nodes associated with the IAB node, and the IAB-MT may act as a scheduled node towards parent nodes associated with the IAB node. That is, an IAB donor may be referred to as a parent node in communication with one or more child nodes (e.g., an IAB donor may relay transmissions for UEs through one or more other IAB nodes). Additionally, or alternatively, an IAB node may also be referred to as a parent node or a child node to other IAB nodes, depending on the relay chain or configuration of the AN. Therefore, the IAB-MT entity of IAB nodes may provide a Uu interface for a child IAB node to receive signaling from a parent IAB node, and the DU interface (e.g., DUs 165) may provide a Uu interface for a parent IAB node to signal to a child IAB node or UE 115.

For example, IAB node may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes. For example, the DU 165 of IAB donor may relay transmissions to UEs 115 through IAB nodes, and may directly signal transmissions to a UE 115. The CU 160 of IAB donor may signal communication link establishment via an F1 interface to IAB nodes, and the IAB nodes may schedule transmissions (e.g., transmissions to the UEs 115 relayed from the IAB donor) through the DUs 165. That is, data may be relayed to and from IAB nodes via signaling over an NR Uu interface to MT of the IAB node. Communications with IAB node may be scheduled by a DU 165 of IAB donor and communications with IAB node may be scheduled by DU 165 of IAB node.

In the case of the techniques described herein applied in the context of a disaggregated RAN architecture, one or more components of the disaggregated RAN architecture may be configured to support active interference cancellation for sidelink transmissions as described herein. For example, some operations described as being performed by a UE 115 or a network device 140 (e.g., a base station 105) may additionally, or alternatively, be performed by one or more components of the disaggregated RAN architecture (e.g., IAB nodes, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105, network devices 140, or both and the network equipment including macro eNBs or gNBs, small cell eNBs or gNBs, or relay base stations, among other examples, as shown in FIG. 1.

The UEs 115 and the base stations 105, network devices 140, or both may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115.

A carrier may be operated in a standalone mode where initial acquisition and connection may be conducted by the UEs 115 via the carrier, or the carrier may be operated in a non-standalone mode where a connection is anchored via a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105, network device 140, or both may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105, network device 140, or both may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105, network device 140, or both may be movable and therefore provide communication coverage for a moving geographic coverage area 110. In some examples, different geographic coverage areas 110 associated with different technologies may overlap, but the different geographic coverage areas 110 may be supported by the same base station 105, network device 140, or both. In other examples, the overlapping geographic coverage areas 110 associated with different technologies may be supported by different base stations 105, network devices 140, or both. The wireless communications system 100 may include, for example, a heterogeneous network in which different types of the network devices 140 provide coverage for various geographic coverage areas 110 using the same or different radio access technologies.

The wireless communications system 100 may support synchronous or asynchronous operation. For synchronous operation, the base stations 105, network devices 140, or both may have similar frame timings, and transmissions from different base stations 105, network devices 140, or both may be approximately aligned in time. For asynchronous operation, the base stations 105, network devices 140, or both may have different frame timings, and transmissions from different base stations 105, network devices 140, or both may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105, network device 140, or both. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105, network device 140, or both.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network device 140, which may be an example of an access node controller (ANC). Each access network device 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network device 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a network device 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105, a network device 140, or both may have an antenna array with a number of rows and columns of antenna ports that the base station 105, the network device 140, or both may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105, network devices 140, or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115, a network device 140) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105, a network device 140, or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105, a network device 140, or both multiple times in different directions. For example, the base station 105, the network device 140, or both may transmit a signal according to different beamforming weight sets associated with different directions of transmission. Transmissions in different beam directions may be used to identify (e.g., by a transmitting device, such as a base station 105, a network device 140, or both, or by a receiving device, such as a UE 115) a beam direction for later transmission or reception by the base station 105, the network device 140, or both.

Some signals, such as data signals associated with a particular receiving device, may be transmitted by a base station 105, the network device 140, or both in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105, the network device 140, or both in different directions and may report to the base station 105, the network device 140, or both an indication of the signal that the UE 115 received with a highest signal quality or an otherwise acceptable signal quality.

In some examples, transmissions by a device (e.g., by a base station 105, a network device 140, or both or a UE 115) may be performed using multiple beam directions, and the device may use a combination of digital precoding or radio frequency beamforming to generate a combined beam for transmission (e.g., from a base station 105, a network device 140, or both to a UE 115). The UE 115 may report feedback that indicates precoding weights for one or more beam directions, and the feedback may correspond to a configured number of beams across a system bandwidth or one or more sub-bands. The base station 105, the network device 140, or both may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a network device 140, or a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, the network device 140, or both, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115, the base stations 105, and the network devices 140 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105, a network device 140, or both may include a communications manager 101 configured to schedule communications at a UE 115 via control signaling. The control signaling may be RRC signaling, a MAC-CE, or a DCI in a downlink control channel. In some cases, the control signaling may include one or more grants, which may indicate a set of time-frequency resources for one or more downlink transmissions from the base station 105, the network device 140, or both.

In some cases, the UE 115 may include a communications manager 102 configured to monitor for the downlink transmissions during the time-frequency resources indicated in each grant. The UE 115 may transmit a feedback message (e.g., an ACK or a NACK) based on monitoring for the downlink transmissions. In some examples, the UE 115 may generate a feedback codebook for one or more feedback messages based on the control signaling. The UE 115 may use the feedback codebook to transmit the feedback messages such that they align with the downlink transmissions in a duration for transmitting the feedback message, which may be referred to as a feedback occasion. In some examples, to avoid a mismatch of codebook size, the number of feedback bits for each DCI message may be fixed, which may reduce resource allocation efficiency by reducing the flexibility of scheduling or wasting feedback bits in the codebook.

In some cases, a base station 105 (e.g., using communications manager 101) may transmit a feedback configuration to a UE 115 using control signaling. The feedback configuration may indicate a number of feedback bits, such as ACK or NACK bits, per grant for a feedback occasion. The feedback configuration may define a number of feedback bits per grant via an RRC configuration or a MAC-CE. In some cases, the UE 115 (e.g., using communications manager 102) may transmit the feedback message with the number of feedback bits for each grant as defined by the feedback configuration. If a number of downlink transmissions (e.g., PDSCH transmissions) is less than the number feedback bits, then the UE may perform zero-padding by adding one or more zero-value bits to the codebook associated with one or more downlink transmissions to maintain equal codebook sizes, as described herein. For example, if there are more PDSCH transmissions or a DCI message with fewer bits than the number of feedback bits, the UE may add zeros to the codebook for the PDSCH transmissions or zero value bits to the DCI message. If the number of downlink transmissions is greater than the number of feedback bits, some of downlink transmissions may be bundled together according to a bundling pattern for the feedback message, as described herein. For example, the base station 105 (e.g., network device 140, network device, or the like) may transmit the downlink transmissions together in a transmission occasion, or duration for transmitting. The base station 105 may transmit an indication of the bundling pattern to the UE 115. In some cases, the UE 115 may receive a downlink control channel message, such as a DCI message, that explicitly indicates a number of feedback bits for upcoming grants within a feedback occasion.

Figure 2:
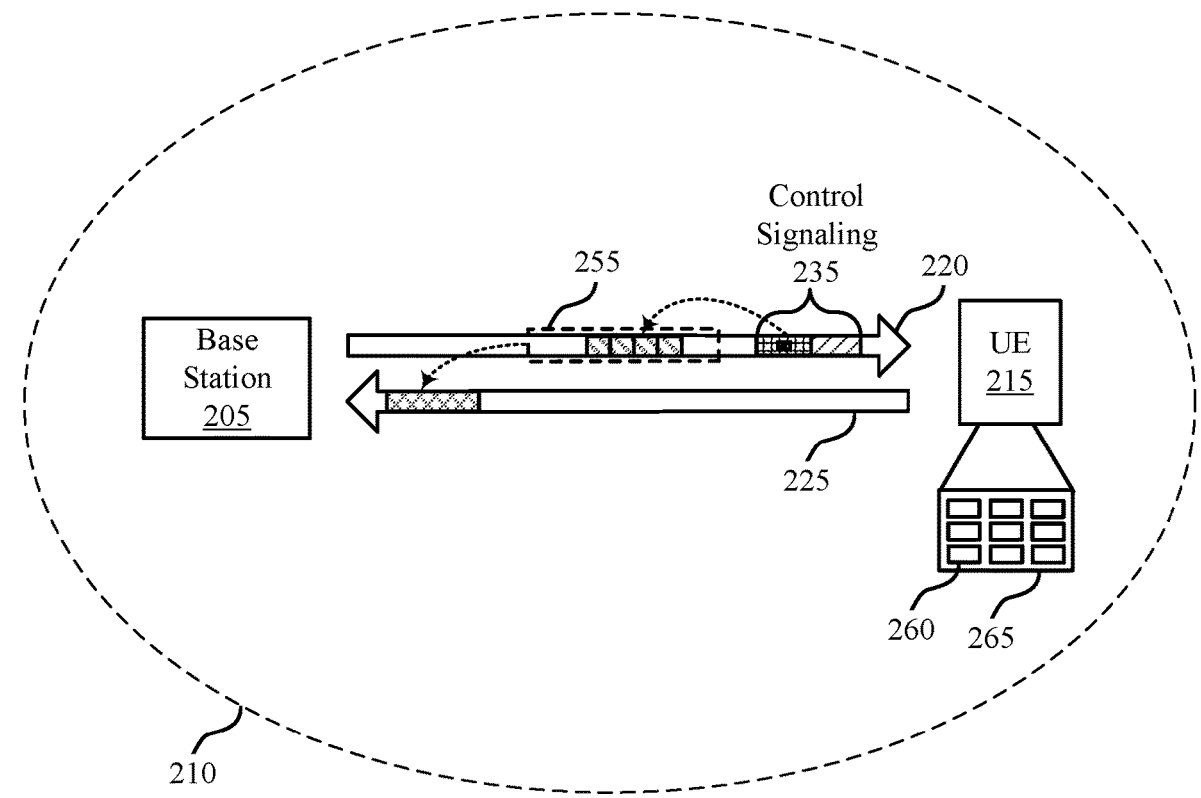
Figure 2:
Figure 2:
Figure 2:
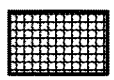
Figure 2:
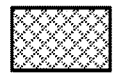
Figure 2:
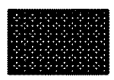

FIG. 2 illustrates an example of a wireless communications system 200 that supports grant-based feedback bit determination for feedback occasions in accordance with one or more aspects of the present disclosure. In some examples, wireless communications system 200 may implement aspects of wireless communications system 100 and may include a UE 215 and a base station 205 with a coverage area 210, which may be examples of a UE 115 and a base station 105 with a coverage area 110 as described with reference to FIG. 1. In some examples, the base station 205 and the UE 215 may communicate control information, data, or both using a downlink communication link 220 and an uplink communication link 225. For example, the base station 205 may transmit a feedback configuration 230 to the UE 215 using the downlink communication link 220 to flexibly allocate resources to the UE 215 for feedback to the base station 205 via the uplink communication link 225.

In some examples, a base station 205 may schedule communications at a UE 215 via downlink communication link 220. For example, the base station 205 may transmit control signaling 235 to the UE 215. The control signaling 235 may be RRC signaling, a MAC-CE, or a DCI in a downlink control channel (e.g., a physical downlink control channel (PDCCH)). In some cases, the control signaling 235 may include one or more grants 240, which may allocate a set of time-frequency resources for the communications for the UE 215. In some examples, the grants 240 may indicate a set of time-frequency resources for downlink transmissions 245 from the base station 205. The downlink transmissions 245 may include data packets for a data transmission from the base station 205 to the UE 215 via downlink communication link 220. In some examples, the downlink transmissions 245 may be downlink shared channel transmissions, such as PDSCH transmissions. There may be one or more downlink transmissions 245 per grant 240.

In some cases, the UE 215 may monitor for the downlink transmissions 245 during the time-frequency resources indicated in each grant 240. For example, the UE 215 may receive a DCI message in the control signaling 235 scheduling multiple downlink transmissions 245 and may monitor for the downlink transmissions 245 based on the scheduling information. In some examples, the UE 215 may transmit a feedback message 250 based on monitoring for the downlink transmissions 245. In some cases, the UE 215 may transmit an ACK for a downlink transmission 245 based on successfully receiving and decoding the downlink transmission 245. In some other cases, the UE 215 may transmit a NACK for a downlink transmission 245 based on unsuccessfully receiving or decoding the downlink transmission 245.

In some examples, the UE 215 may generate a feedback codebook for one or more feedback messages 250 based on the DCI message in the control signaling 235. The UE 215 may use the feedback codebook to transmit the feedback messages 250 such that they align with the downlink transmissions 245 in a feedback occasion 255. To align a feedback message 250 with a downlink transmission 245, the UE 215 may monitor for one or more downlink transmissions 245 during a feedback occasion 255, which may be a period of time associated with the feedback message 250. If a downlink transmission 245 is outside of the feedback occasion 255, the UE 215 may not include feedback for such a downlink transmission 245 in the feedback message 250 associated with the feedback occasion 255. The feedback occasion 255 may vary based on a UE capability of the UE 215. Additionally or alternatively, the feedback occasion 255 may be configured by a network (e.g., by the base station 205) via control signaling 235. The UE 215 may transmit a feedback codebook as part of the feedback message 250, which may be a matrix that allows the UE 215 to transform a data bit from a downlink transmission 245 to another set of data, such as a feedback bit for a feedback message 250, that maps to each antenna port 260 of an antenna array 265 of the UE 215. The UE 215 may use any number of antenna ports 260 for communicating via an antenna array 265. A data bit may map to each antenna port 260, which may be a logical representation of one or more elements of the antenna array 265, such that the UE 215 may transmit the feedback message using one or more antenna ports 260 associated with the antenna array 265. In some cases, there may be multiple types of codebooks, such as a Type 1 codebook and a Type 2 codebook. A Type 1 codebook may use a predefined matrix selected by the UE 215 or the base station 205, while a Type 2 codebook may have one or more parameters the UE 215 or the base station 205 adjusts based on UE reporting or control information. The feedback codebook may be a Type 2 HARQ-ACK codebook.

Each feedback message 250 may be associated with one or more downlink transmissions 245 scheduled within a feedback occasion 255 for the feedback message 250 by one or more DCI messages (e.g., grants 240). In some examples, the UE 215 may generate the feedback codebook based on counting one or more DAIs 242 (e.g., counter DAI (C-DAI) or total-DAI (T-DAI)), which may point to a scheduled downlink transmission 245 that is bundled to a feedback message 250 (e.g., one or more downlink transmissions 245 may be considered bundled to feedback message 250 if the one or more downlink transmissions 245 are scheduled within feedback occasion 255). For example, the UE 215 may count DAIs 242 per DCI message, per downlink transmission 245 (e.g., per PDSCH transmission), or based on a factor of downlink transmissions 245. The factor may be a value, M, such that the UE 215 may count DAIs 242 every M scheduled downlink transmissions 245 (every 2, 3, 4, etc.). The factor may be configurable at the UE 215 (e.g., via control signaling by the UE 215 or may be preconfigured at the UE 215).

In some examples, if the UE 215 counts DAIs 242 per DCI message, to avoid a mismatch of codebook size (e.g., if one feedback codebook contains feedback information for 2 downlink transmissions 245 while another feedback codebook contains feedback information for 3 downlink transmissions 245), the number of feedback bits for each DCI message may be fixed. For example, the UE 215 may bundle the feedback bits for a grant 240 scheduling one or more downlink transmissions 245 together, such that the UE 215 may send a NACK if one of the downlink transmissions is received unsuccessfully. However, if the UE 215 transmits a NACK for the downlink transmissions 245 based on receiving one downlink transmission 245 unsuccessfully while other downlink transmissions 245 are received successfully, the base station 205 may transmit all downlink transmissions 245 as part of a retransmission (e.g. due to the one or more, which may result in redundant retransmissions (e.g., if some of the downlink transmissions 245 for the grant are successful) and wasted or inefficient use of resources. In some other examples, the base station 205 may fix a number of downlink transmissions 245 granted by a DCI in a downlink control channel (e.g., PDCCH) to avoid codebook size mismatch, which may reduce resource allocation efficiency by reducing the flexibility of scheduling or wasting feedback bits in the codebook. For example, if the base station 205 schedules a reduced number of downlink transmissions 245, the UE 215 may apply zero-padding (e.g., may add zero-value bits) to generate a feedback codebook.

In some cases, a base station 205 may transmit a feedback configuration 230 to the UE 215 in control signaling 235. In some examples, the base station 205 may transmit the feedback configuration in a same message as or as part of the control signaling 235 that includes one or more grants 240 scheduling downlink transmissions 245. In some other examples, the base station 205 may transmit the feedback configuration in a different message than the control signaling 235 that includes the one or more grants 240. In some examples, the feedback configuration 230 may indicate a number of feedback bits, such as ACK or NACK bits, per grant 240, such that for each feedback occasion 255, the corresponding downlink transmissions 245 may have a same number of feedback bits as each downlink transmission 245 of the downlink transmissions 245 (e.g., the feedback message for the feedback occasion may include respective sets of bits for each downlink transmission 245 of the feedback occasions and each set of bits has the same number of bits). This may reduce signaling overhead and latency related to retransmission by adjusting the number of feedback bits according to a flexible scheme. In some examples, the grant 240 may be a downlink shared channel (e.g., PDSCH) grant. In some cases, from one feedback occasion 255 to another the feedback configuration 230 may allow a different number of feedback bits per grant 240. In some cases, the UE 215 may transmit the feedback message 250 based on the feedback configuration 230. That is, the UE 215 may transmit the feedback message 250 with a number of feedback bits for each grant 240 as defined by the feedback configuration.

In some cases, the feedback configuration 230 may define a number of feedback bits per grant 240 via an RRC configuration or a MAC-CE. If a number of downlink transmissions 245 (e.g., PDSCH transmissions) is less than the number feedback bits, then the UE 215 may perform zero-padding by adding one or more zero-value bits to the codebook of the downlink transmissions 245 to maintain equal codebook sizes, which is described in further detail with respect to FIG. 3A. If the number of downlink transmissions 245 is greater than the number of feedback bits, then some of downlink transmissions 245 may be bundled together according to a bundling pattern for the feedback message 250, which is described in further detail with respect to FIG. 3B. In some examples, the base station 205 may indicate the bundling pattern to the UE 215, such as in the control signaling 235 or in some other control information message.

In some cases, the UE 215 may receive a downlink control channel message, such as a DCI message, that explicitly indicates a number of feedback bits for upcoming grants 240 within a feedback occasion 255. For example, the DCI message may indicate a number of feedback bits for the feedback message 250 for downlink transmissions 245 transmitted during feedback occasion 255. The UE 215 may receive the DCI message according to a format, such as a fallback DCI format (e.g., DCI Format 1_0, which may be associated with a default DCI format) or a non-fallback DCI format (e.g., a format other than DCI Format 1_0). In one example, the fallback DCI may schedule one downlink transmission 245, while a non-fallback DCI may schedule multiple PDSCH transmissions 245. In some examples, when a non-fallback DCI schedules a downlink transmission 245 (e.g., a PDSCH transmission or a semi-persistent scheduling (SPS) PDSCH transmission) within a feedback occasion 255 with grants 240, such as multi-PDSCH grants, the UE 215 may ensure that the number of feedback bits for each grant 240 including the grant of the non-fallback DCI are the same to avoid codebook mismatch.

For example, the UE 215 may not determine a received fallback DCI is a fallback DCI, thus the UE 215 may treat the fallback DCI as a non-fallback DCI. That is, the UE 215 may pack a value, N, of feedback bits for the feedback message 250, where N equals the number of feedback bits of a non-fallback DCI. Similarly, if the UE 215 successfully receives a fallback DCI, the UE 215 may generate a value, N, of feedback bits for one or more grants 240 indicated by the fallback DCI as well. The UE 215 may generate the feedback bits by performing repetitions of the feedback bits or zero padding the feedback codebook. For example, the UE 215 may receive a grant 240 in the control signaling 235 indicating at least one grant 240 has been unsuccessfully received at the UE 215. The UE 215 may transmit a set of zero-value bits for the grant 240 in the feedback message 250. In some other examples, the UE 215 may receive a grant 240 in the control signaling 235 scheduling less downlink transmissions 245 than a number of feedback bits indicated by the feedback configuration 230. The UE 215 may repeat one or more bits in the feedback message 250.

Although one feedback occasion 255 is shown in FIG. 2, the UE 215 may monitor for downlink transmissions during multiple feedback occasions 255. In some cases, the feedback configuration 230 may indicate a number of feedback bits for each grant per feedback occasion 255. The number of feedback bits may vary between feedback occasions 255.

Figure 3A:
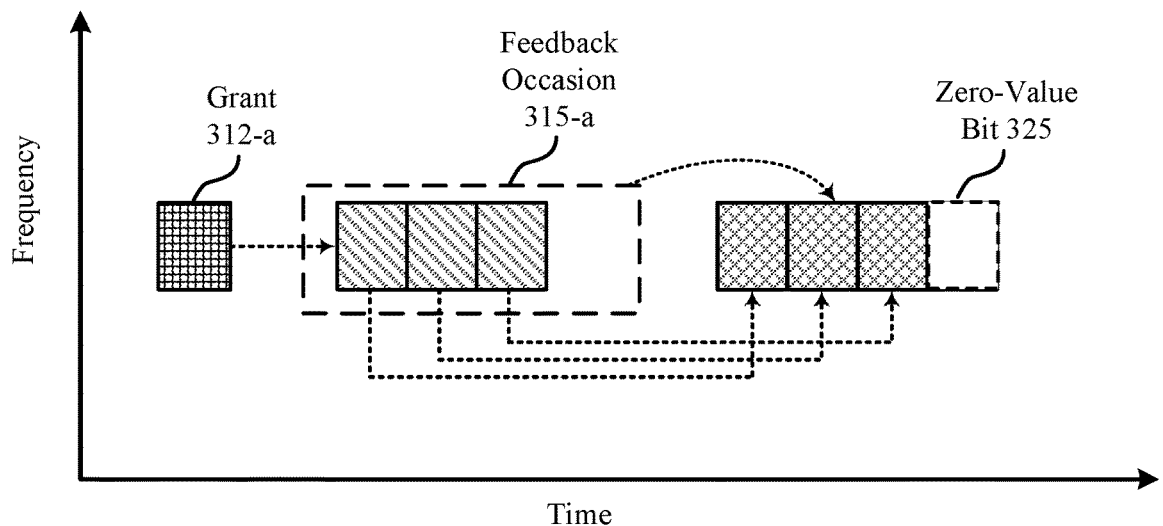
FIGS. 3A and 3B illustrate examples of resource diagrams that support grant-based feedback bit determination for feedback occasions in accordance with one or more aspects of the present disclosure.
Figure 3B:
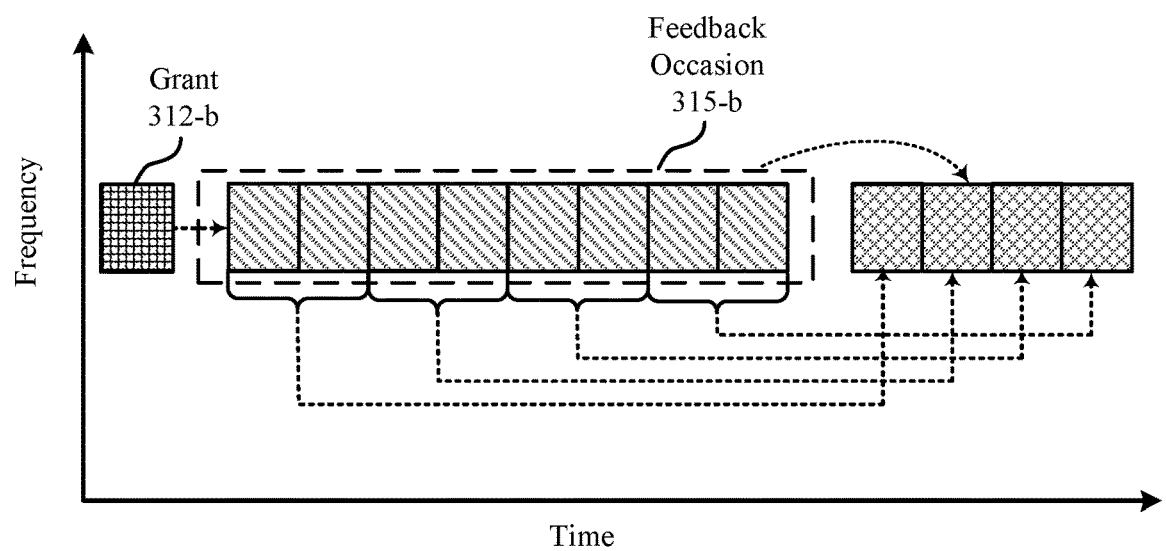

FIGS. 3A and 3B illustrate examples of resource diagram 300-a and resource diagram 300-b that support grant-based feedback bit determination for feedback occasions in accordance with one or more aspects of the present disclosure. In some examples, resource diagram 300-a and resource diagram 300-b may implement aspects of wireless communications system 100 and wireless communications system 200. For example, resource diagram 300-a and resource diagram 300-b may be implemented by a UE 115, a UE 215, a base station 105, and a base station 205 as described with reference to FIGS. 1 and 2. In some cases, a base station may transmit control signaling to a UE including one or more grants scheduling downlink transmissions 305 and one or more feedback messages for the downlink transmissions 305. In some examples, as illustrated in FIG. 3A, the number of downlink transmissions 305 may be less than a number of feedback bits 310 for a grant, and the UE may perform zero padding. In some other examples, as illustrated in FIG. 3B, the number of downlink transmissions 305 may be greater than a number of feedback bits 310 for a grant 312-a and a grant 312-b, and the UE may bundle the feedback for downlink transmissions 305. In some cases, grant 312-a and grant 312-b may schedule one or multiple downlink transmissions 305.

In some cases, the UE may receive a feedback configuration from a base station. For example, the UE may receive an RRC configuration or a MAC-CE indicating the feedback configuration. The feedback configuration may specify a number of feedback bits 310 per grant for one or more downlink transmissions 305, such as PDSCH transmissions, in a feedback occasion 315-a or a feedback occasion 315-b. In some cases, grant 312-a or grant 312-b may be transmitted within a feedback occasion 315-a or a feedback occasion 315-b.

In some cases, as illustrated in FIG. 3A, if a number of downlink transmissions 305 is less than the number of feedback bits 310 specified in the feedback configuration, then the UE may perform zero-padding by adding one or more zero-value bits 325 to the feedback codebook. The UE may perform the zero-padding to maintain equal codebook sizes for feedback occasion 315-a. For example, if the feedback configuration specifies that the number of feedback bits 310 for grant 312-a is 4, and 3 downlink transmissions 305 were granted, then the UE may add 0 to the feedback codebook. That is, the UE may add a zero-value bit 325 to the feedback codebook associated with feedback occasion 315-a to align the feedback bits with one or more downlink transmissions 305. The alignment may provide for reduced transmission errors, which may increase communication efficiency (e.g., due to fewer failed transmissions).

In some other cases, as illustrated in FIG. 3B, if a number of downlink transmissions 305 is greater than the number of feedback bits 310, then the UE may bundle together one or more of the downlink transmissions 305 according to a bundling pattern for a feedback message. The UE may bundle the feedback bits for downlink transmissions 305 during feedback occasion 315-b to avoid codebook mismatch. For example, if the feedback configuration specifies the number of feedback bits 310 per grant 312-b is 4, and 8 downlink transmissions 305 were granted for feedback occasion 315-b, then the UE may bundle the feedback message (e.g., an ACK or a NACK) of two downlink transmission 305 together. In some other examples, the UE may bundle a feedback message for portion of the downlink transmissions 305. That is, if the number of feedback bits 310 per grant 312-b is 4, and 6 downlink transmissions 305 were granted for feedback occasion 315-b, then the feedback message of the first and second downlink transmissions 305 and the feedback message of the third and fourth downlink transmissions 305 could be bundled together, respectively, while the feedback messages for the fifth and sixth downlink transmissions 305 remain unbundled. In some examples, the base station may indicate the bundling pattern to the UE, such as in control signaling. For example, the UE may determine the bundling pattern based on the RRC configuration or the MAC-CE.

Figure 4:
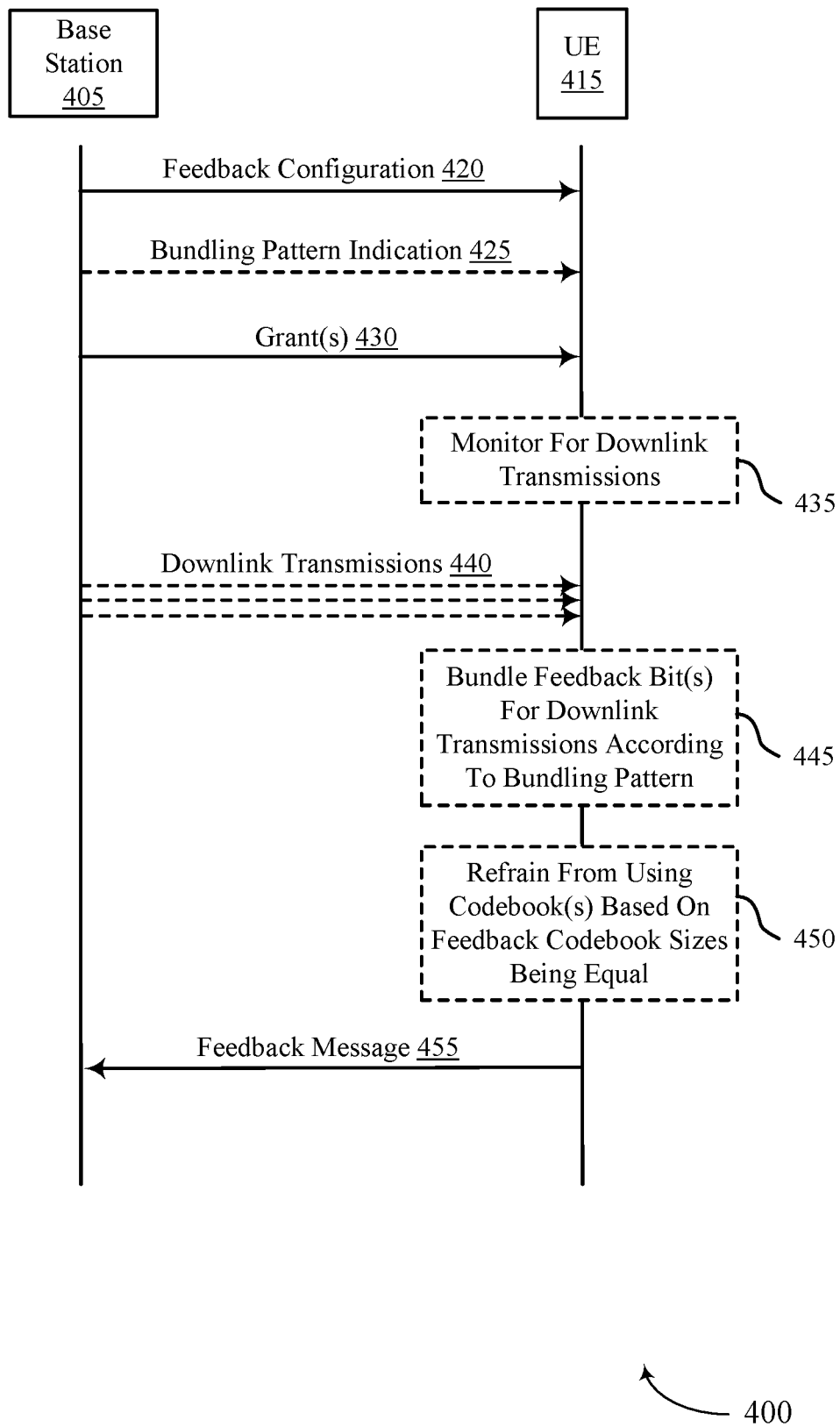
FIG. 4 illustrates an example of a process flow that supports grant-based feedback bit determination for feedback occasions in accordance with one or more aspects of the present disclosure.

FIG. 4 illustrates an example of a process flow 400 that supports grant-based feedback bit determination for feedback occasions in accordance with one or more aspects of the present disclosure. In some examples, process flow 400 may implement aspects of wireless communications system 100, wireless communication system 200, resource diagram 300-a, and resource diagram 300-b. The process flow 400 may illustrate an example of a base station 405 transmitting a grant to a UE 415 scheduling downlink transmissions and feedback bits per feedback occasion. Alternative examples of the following may be implemented, where some processes are performed in a different order than described or are not performed. In some cases, processes may include additional features not mentioned below, or further processes may be added.

At 420, a UE 415 may receive a feedback configuration from a base station 405 for one or more feedback occasions. The feedback configuration may indicate a number of feedback bits to provide for each grant within a feedback occasion for the UE 415. In some cases, receiving the feedback configuration may include receiving control signaling for an RRC configuration or a MAC-CE. The control signaling may include the feedback configuration indicating the number of feedback bits. In some cases, receiving the feedback configuration may include receiving a DCI in a downlink control channel (e.g., a PDCCH) that includes the feedback configuration.

In some cases, the UE 415 may receive a control message that schedules a single downlink shared channel transmission within a feedback occasion. The feedback configuration may indicate the number of feedback bits to provide for the single downlink shared channel transmission. In some cases, the number of feedback bits to provide for each grant within the feedback occasion for the UE 415 indicated in the feedback configuration may be based on a first size of a first feedback codebook being equal to a second size of a second feedback codebook. That is, the base station 405 may determine the feedback configuration based on matching a feedback codebook size for the downlink transmissions and a feedback message.

At 425, the UE 415 may receive an indication of a bundling pattern from a base station 405. In some cases, the bundling pattern indication may be included in control signaling. For example, the base station 405 may transmit a DCI message, RRC signaling, a MAC-CE, or the like, to the UE 415 that may include the bundling pattern indication. In some examples, the UE 415 may include the bundling pattern indication in same control signaling as the feedback configuration. In some other examples, the UE 415 may include the bundling pattern configuration in different control signaling than the feedback configuration.

At 430, the UE 415 may receive, from a base station 405, one or more grants for the UE 415 within the feedback occasion. The grants may schedule one or more downlink transmissions, such as PDSCH transmissions. In some cases, a grant may indicate that at least one grant has been unsuccessfully received at the UE 415. A UE 415 may transmit a set of feedback bits for the at least one grant in a feedback message. The set of feedback bits may include a set of zero value bits equal to the number of feedback bits indicated by the feedback configuration (e.g., zero-padding bits). In some cases, a grant may schedule a number of downlink shared channel transmissions that is less than the number of feedback bits indicated by the feedback configuration. A UE 415 may repeat at least one bit of a set of feedback bits for the number of downlink shared channel transmissions in the feedback message. The number of downlink shared channel transmissions may be less than the number of feedback bits indicated by the feedback configuration.

At 435, the UE 415 may monitor for a number of downlink shared channel transmissions scheduled by one or more grants. In some cases, the UE 415 may monitor for a number of downlink shared channel transmissions scheduled by a grant where the number of downlink shared channel transmissions is greater than the number of feedback bits to provide for each grant.

At 440, the base station 405 may transmit to the UE 415 one or more downlink transmissions. In some cases, the one or more downlink transmissions may be downlink shared channel transmissions (e.g., PDSCH transmissions) including data packets. The number of downlink shared channel transmissions may be less than a number of feedback bits to provide for each grant. If the number of downlink shared channel transmissions is less than the number of feedback bits, the UE 415 may perform zero-padding to avoid codebook mismatch as described with reference to FIG. 3A.

At 445, the UE 415 may bundle one or more feedback bits for the number of downlink shared channel transmissions according to a bundling pattern where a feedback message includes the bundled one or more feedback bits. For example, if the number of downlink transmissions is greater than the number of feedback bits, the UE 415 may bundle the feedback messages for downlink transmissions according to a bundling pattern, as described with reference to FIG. 3B.

At 450, the UE 415 may refrain from using one or more codebooks for the number of downlink shared channel transmissions based on a first size of a first feedback codebook for the set of bits for the grant being equal to a second size of a second feedback codebook for a second set of bits for a second grant.

At 455, the UE 415 may transmit, based on receiving one or more grants, a feedback message that includes a respective set of bits for each respective grant of the one or more grants within the feedback occasion. The feedback message may include an ACK or a NACK for each downlink transmission for a grant. Each respective set of bits may have a number of bits for the number of feedback bits indicated by the feedback configuration. In some cases, the feedback message may include a set of bits including a first set of feedback bits for the number of downlink shared channel transmissions and one or more zero value bits. In some cases, the number of feedback bits may be different from a second number of feedback bits to provide for each grant within a second feedback occasion for the UE 415. That is, the number of feedback bits for grants within a feedback occasion may vary between feedback occasions.

Figure 5:
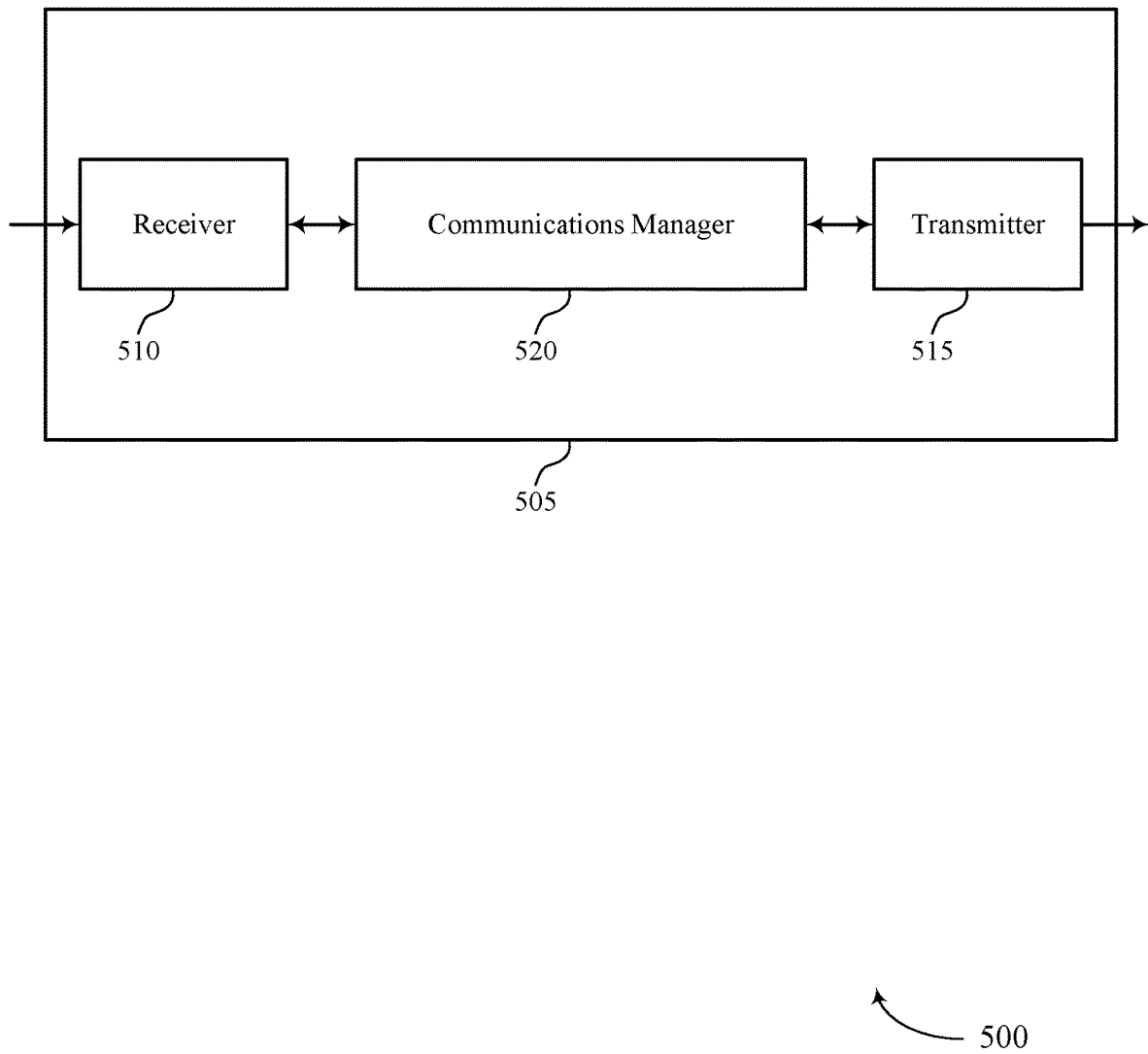
FIGS. 5 and 6 show block diagrams of devices that support grant-based feedback bit determination for feedback occasions in accordance with one or more aspects of the present disclosure.

FIG. 5 shows a block diagram 500 of a device 505 that supports grant-based feedback bit determination for feedback occasions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to grant-based feedback bit determination for feedback occasions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to grant-based feedback bit determination for feedback occasions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of grant-based feedback bit determination for feedback occasions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a network device, a feedback configuration indicating a number of feedback bits to provide for each grant within a feedback occasion associated with the UE. The communications manager 520 may be configured as or otherwise support a means for receiving one or more grants for the UE within the feedback occasion. The communications manager 520 may be configured as or otherwise support a means for transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station to transmit a feedback configuration to a UE indicating a number of feedback bits for each grant in a feedback occasion, which may reduce processing, reduce power consumption, enable more efficient utilization of communication resources, or the like.

Figure 6:
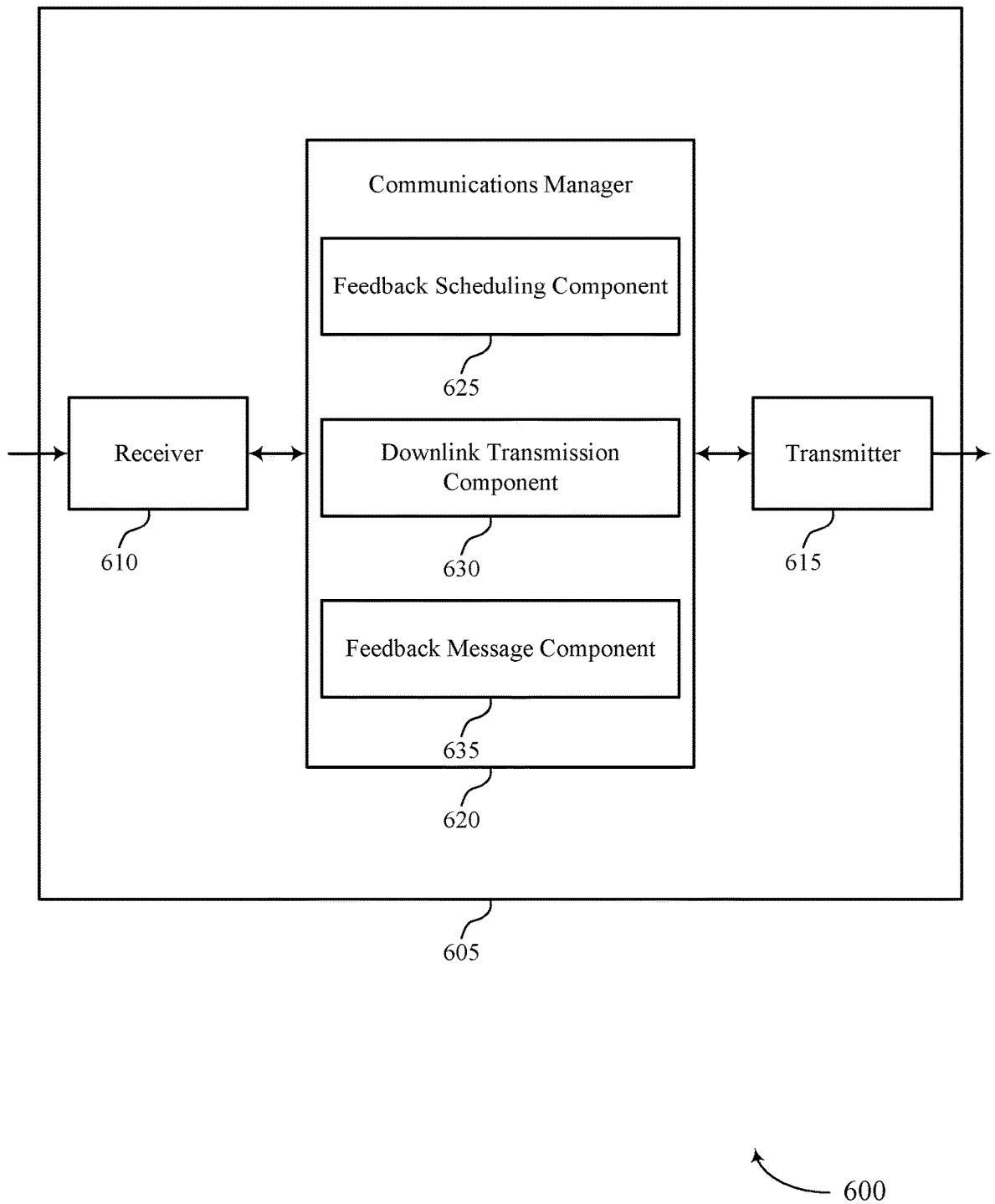

FIG. 6 shows a block diagram 600 of a device 605 that supports grant-based feedback bit determination for feedback occasions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to grant-based feedback bit determination for feedback occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to grant-based feedback bit determination for feedback occasions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of grant-based feedback bit determination for feedback occasions as described herein. For example, the communications manager 620 may include a feedback scheduling component 625, a downlink transmission component 630, a feedback message component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting)

using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The feedback scheduling component 625 may be configured as or otherwise support a means for receiving, from a base station, a feedback configuration indicating a number of feedback bits to provide for each grant within a feedback occasion associated with the UE. The downlink transmission component 630 may be configured as or otherwise support a means for receiving one or more grants for the UE within the feedback occasion. The feedback message component 635 may be configured as or otherwise support a means for transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

Figure 7:
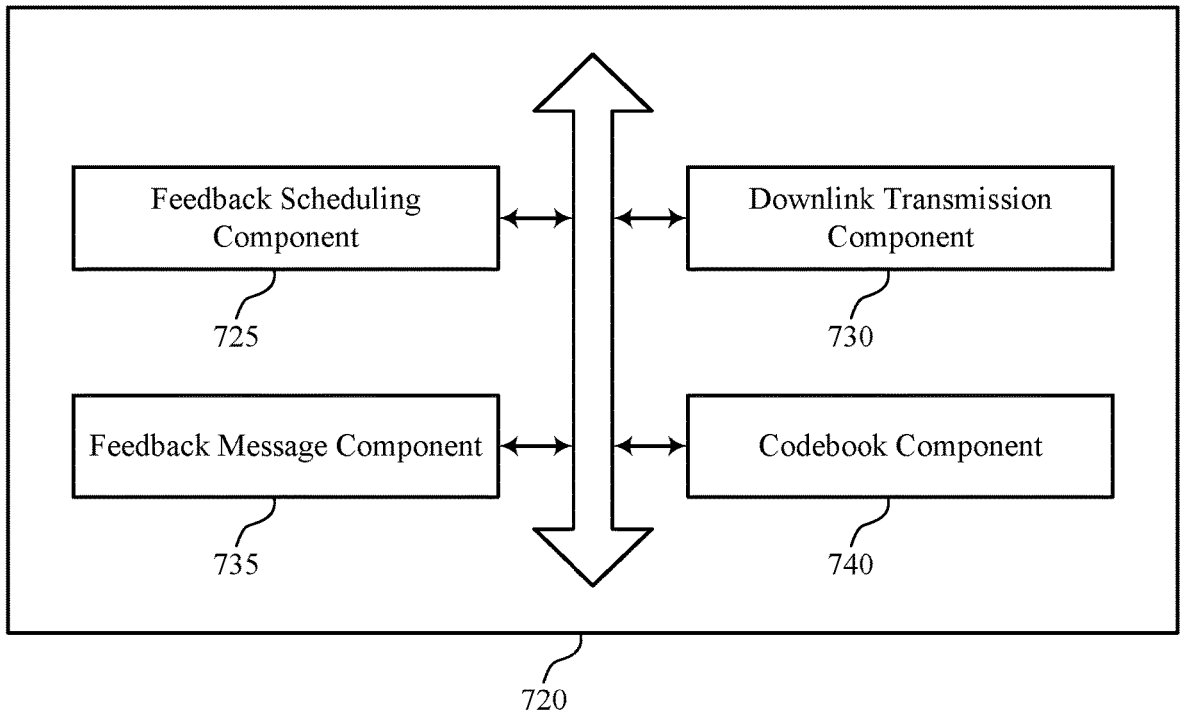
FIG. 7 shows a block diagram of a communications manager that supports grant-based feedback bit determination for feedback occasions in accordance with one or more aspects of the present disclosure.

FIG. 7 shows a block diagram 700 of a communications manager 720 that supports grant-based feedback bit determination for feedback occasions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of grant-based feedback bit determination for feedback occasions as described herein. For example, the communications manager 720 may include a feedback scheduling component 725, a downlink transmission component 730, a feedback message component 735, a codebook component 740, or any combination thereof. Each of these components may communicate, directly or indirectly, with one another (e.g., via one or more buses).

The communications manager 720 may support wireless communications at a UE in accordance with examples as disclosed herein. The feedback scheduling component 725 may be configured as or otherwise support a means for receiving, from a network device, a feedback configuration indicating a number of feedback bits to provide for each grant within a feedback occasion associated with the UE. The downlink transmission component 730 may be configured as or otherwise support a means for receiving one or more grants for the UE within the feedback occasion. The feedback message component 735 may be configured as or otherwise support a means for transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

In some examples, to support receiving the feedback configuration, the feedback scheduling component 725 may be configured as or otherwise support a means for receiving control signaling associated with an RRC configuration or a MAC-CE, the control signaling including the feedback configuration indicating the number of feedback bits.

In some examples, the downlink transmission component 730 may be configured as or otherwise support a means for monitoring for a number of downlink shared channel transmissions scheduled by a grant of the one or more grants, where the number of downlink shared channel transmissions is less than the number of feedback bits to provide for the each grant, where the feedback message includes a set of bits including a first set of feedback bits for the number of downlink shared channel transmissions and one or more zero value bits.

In some examples, the codebook component 740 may be configured as or otherwise support a means for refraining from using one or more codebooks corresponding to the number of downlink shared channel transmissions based on a first size of a first feedback codebook corresponding to the set of bits for the grant being equal to a second size of a second feedback codebook corresponding to a second set of bits for a second grant.

In some examples, the downlink transmission component 730 may be configured as or otherwise support a means for monitoring for a number of downlink shared channel transmissions scheduled by a grant of the one or more grants, where the number of downlink shared channel transmissions is greater than the number of feedback bits to provide for the each grant. In some examples, the feedback message component 735 may be configured as or otherwise support a means for bundling one or more feedback bits associated with the number of downlink shared channel transmissions according to a bundling pattern, where the feedback message includes the bundled one or more feedback bits.

In some examples, the feedback scheduling component 725 may be configured as or otherwise support a means for receiving an indication of the bundling pattern, where the control signaling includes the indication.

In some examples, to support receiving the feedback configuration, the feedback scheduling component 725 may be configured as or otherwise support a means for receiving a downlink control channel that includes the feedback configuration.

In some examples, the downlink transmission component 730 may be configured as or otherwise support a means for receiving a control message that schedules a single downlink shared channel transmission within the feedback occasion, where the feedback configuration indicates the number of feedback bits to provide for the single downlink shared channel transmission.

In some examples, the number of feedback bits to provide for the each grant within the feedback occasion associated with the UE indicated in the feedback configuration is based on a first size of a first feedback codebook being equal to a second size of a second feedback codebook.

In some examples, the downlink transmission component 730 may be configured as or otherwise support a means for receiving a grant of the one or more grants, the grant indicating that at least one grant has been unsuccessfully received at the UE. In some examples, the feedback message component 735 may be configured as or otherwise support a means for transmitting a set of feedback bits for the at least one grant in the feedback message, the set of feedback bits includes a set of zero value bits equal to the number of feedback bits indicated by the feedback configuration.

In some examples, the downlink transmission component 730 may be configured as or otherwise support a means for receiving a grant of the one or more grants, the grant scheduling a number of downlink shared channel transmissions that is less than the number of feedback bits indicated by the feedback configuration. In some examples, the feedback message component 735 may be configured as or otherwise support a means for repeating at least one bit of a set of feedback bits for the number of downlink shared channel transmissions in the feedback message the number of downlink shared channel transmissions being less than the number of feedback bits indicated by the feedback configuration.

In some examples, the number of feedback bits is different from a second number of feedback bits to provide for the each grant within a second feedback occasion associated with the UE.

Figure 8:
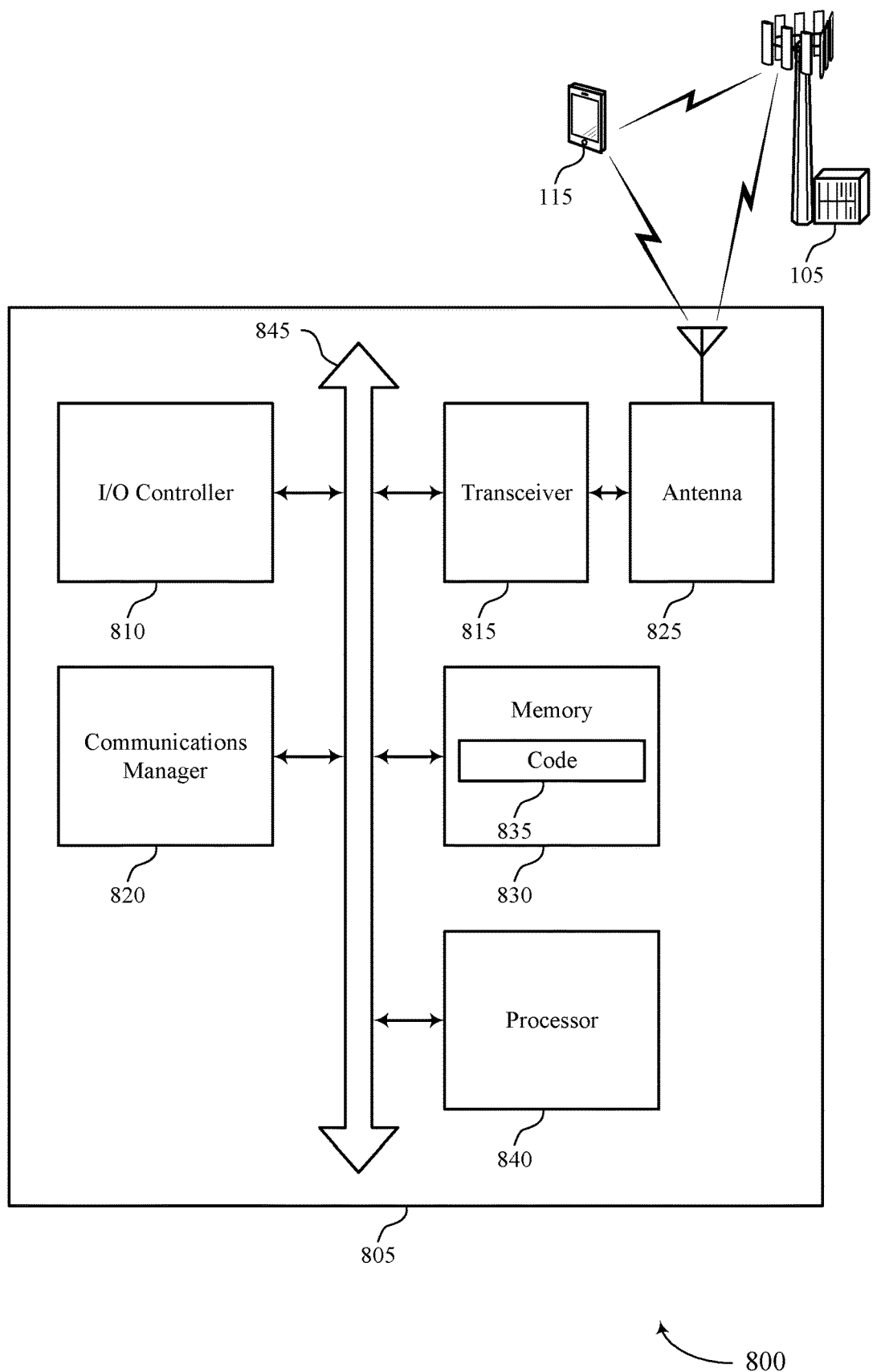
FIG. 8 shows a diagram of a system including a device that supports grant-based feedback bit determination for feedback occasions in accordance with one or more aspects of the present disclosure.

FIG. 8 shows a diagram of a system 800 including a device 805 that supports grant-based feedback bit determination for feedback occasions in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting grant-based feedback bit determination for feedback occasions). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a feedback configuration indicating a number of feedback bits to provide for each grant within a feedback occasion associated with the UE. The communications manager 820 may be configured as or otherwise support a means for receiving one or more grants for the UE within the feedback occasion. The communications manager 820 may be configured as or otherwise support a means for transmitting, based on receiving the one or more grants for the UE, a feedback message that includes a respective set of bits for each of the one or more grants within the feedback occasion, each respective set of bits having a number of bits corresponding to the number of feedback bits indicated by the feedback configuration.

By including or configuring the communications manager 820 in accordance with examples as described herein, the device 805 may support techniques for a base station, or network device, to transmit a feedback configuration to a UE indicating a number of feedback bits for each grant in a feedback occasion, which may improve communication reliability, reduce latency, improve user experience related to reduced processing, reduce power consumption, cause more efficient utilization of communication resources, improve coordination between devices, increase battery life, improve utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of grant-based feedback bit determination for feedback occasions as described herein, or the processor 840 and the memory 830 may be otherwise configured to perform or support such operations.

Figure 9:
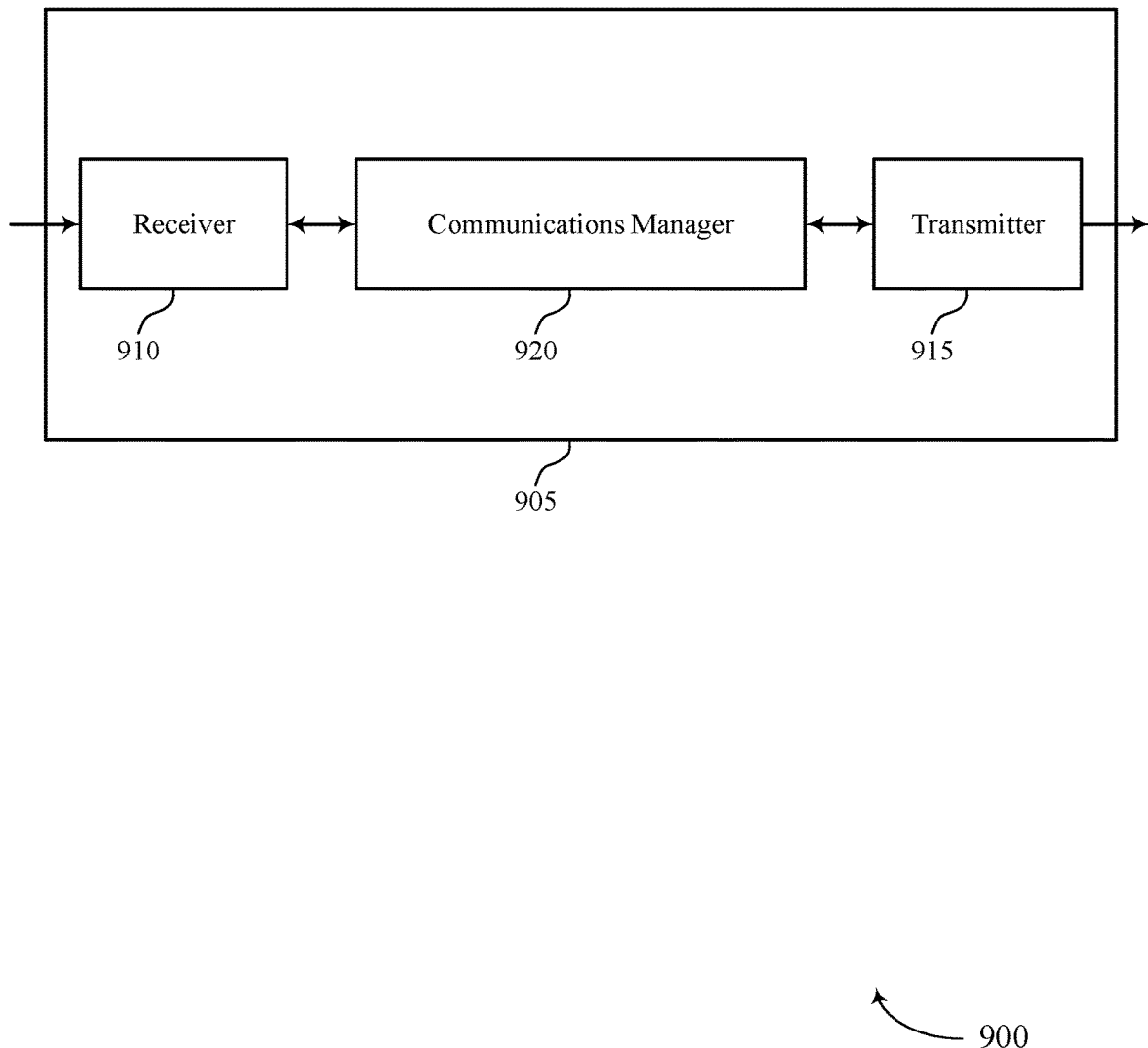
FIGS. 9 and 10 show block diagrams of devices that support grant-based feedback bit determination for feedback occasions in accordance with one or more aspects of the present disclosure.

FIG. 9 shows a block diagram 900 of a device 905 that supports grant-based feedback bit determination for feedback occasions in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to grant-based feedback bit determination for feedback occasions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to grant-based feedback bit determination for feedback occasions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of grant-based feedback bit determination for feedback occasions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station, or network device, in accordance with examples as disclosed herein. For example, the communications manager 920 may be configured as or otherwise support a means for transmitting a feedback configuration indicating a number of feedback bits to provide for each grant within a feedback occasion associated with the UE. The communications manager 920 may be configured as or otherwise support a means for transmitting, to the UE, one or more grants within the feedback occasion. The communications manager 920 may be configured as or otherwise support a means for receiving a feedback message that includes a respective set of bits for each of the one or more grants within the feedback occasion, each respective set of bits having a number of bits corresponding to the number of feedback bits indicated by the feedback configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station to transmit a feedback configuration to a UE indicating a number of feedback bits for each grant in a feedback occasion, which may reduce processing, reduce power consumption, cause more efficient utilization of communication resources, or the like.

Figure 10:
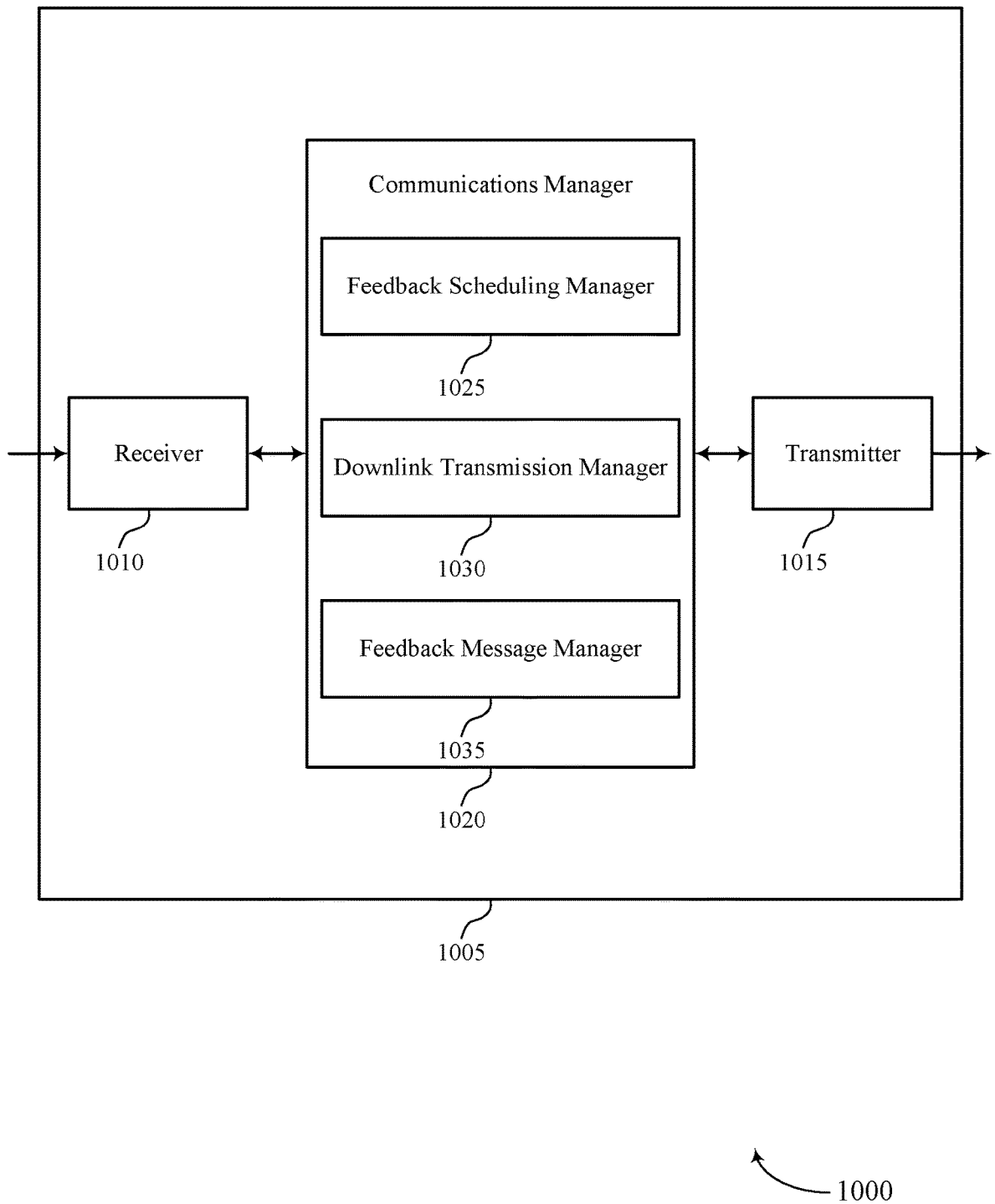

FIG. 10 shows a block diagram 1000 of a device 1005 that supports grant-based feedback bit determination for feedback occasions in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to grant-based feedback bit determination for feedback occasions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to grant-based feedback bit determination for feedback occasions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of grant-based feedback bit determination for feedback occasions as described herein. For example, the communications manager 1020 may include a feedback scheduling manager 1025, a downlink transmission manager 1030, a feedback message manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station, or network device, in accordance with examples as disclosed herein. The feedback scheduling manager 1025 may be configured as or otherwise support a means for transmitting a feedback configuration indicating a number of feedback bits to provide for each grant within a feedback occasion associated with the UE. The downlink transmission manager 1030 may be configured as or otherwise support a means for transmitting one or more grants within the feedback occasion. The feedback message manager 1035 may be configured as or otherwise support a means for receiving a feedback message that includes a respective set of bits for each of the one or more grants within the feedback occasion, each respective set of bits having a number of bits corresponding to the number of feedback bits indicated by the feedback configuration.

Figure 11:
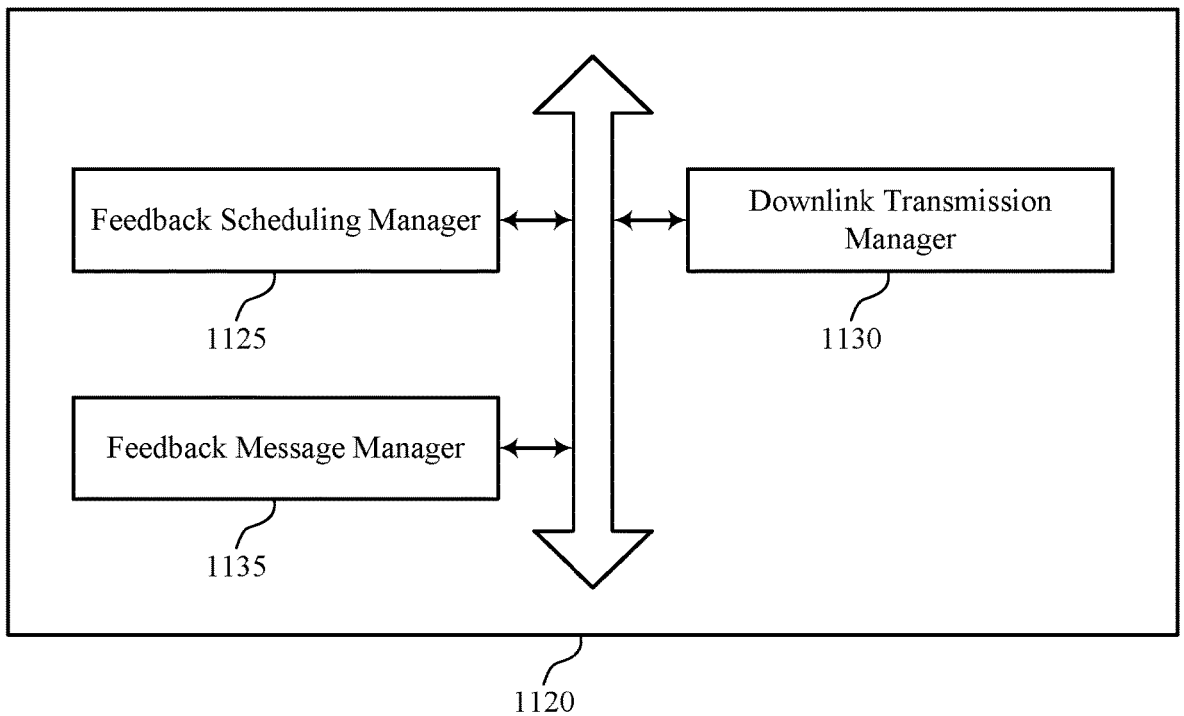
FIG. 11 shows a block diagram of a communications manager that supports grant-based feedback bit determination for feedback occasions in accordance with one or more aspects of the present disclosure.

FIG. 11 shows a block diagram 1100 of a communications manager 1120 that supports grant-based feedback bit determination for feedback occasions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of grant-based feedback bit determination for feedback occasions as described herein. For example, the communications manager 1120 may include a feedback scheduling manager 1125, a downlink transmission manager 1130, a feedback message manager 1135, or any combination thereof. Each of these components may communicate, directly or indirectly, with one another (e.g., via one or more buses).

The communications manager 1120 may support wireless communications at a base station, or network device, in accordance with examples as disclosed herein. The feedback scheduling manager 1125 may be configured as or otherwise support a means for transmitting a feedback configuration indicating a number of feedback bits to provide for each grant within a feedback occasion associated with the UE. The downlink transmission manager 1130 may be configured as or otherwise support a means for transmitting one or more grants within the feedback occasion. The feedback message manager 1135 may be configured as or otherwise support a means for receiving a feedback message that includes a respective set of bits for each respective grant of the one or more grants within the feedback occasion, each respective set of bits having a number of bits corresponding to the number of feedback bits indicated by the feedback configuration.

In some examples, to support transmitting the feedback configuration, the feedback scheduling manager 1125 may be configured as or otherwise support a means for transmitting control signaling associated with an RRC configuration or a MAC-CE, the control signaling including the feedback configuration indicating the number of feedback bits.

In some examples, the downlink transmission manager 1130 may be configured as or otherwise support a means for transmitting a number of downlink shared channel transmissions scheduled by a grant of the one or more grants, where the number of downlink shared channel transmissions is less than the number of feedback bits to provide for the each grant, where the feedback message includes a set of bits including a first set of feedback bits for the number of downlink shared channel transmissions and one or more zero value bits.

In some examples, the downlink transmission manager 1130 may be configured as or otherwise support a means for transmitting a number of downlink shared channel transmissions scheduled by a grant of the one or more grants, where the number of downlink shared channel transmissions is greater than the number of feedback bits to provide for the each grant. In some examples, the feedback message manager 1135 may be configured as or otherwise support a means for receiving one or more feedback bits associated with the number of downlink shared channel transmissions according to a bundling pattern, where the feedback message includes one or more bundled feedback bits.

In some examples, the feedback scheduling manager 1125 may be configured as or otherwise support a means for transmitting an indication of the bundling pattern, where the control signaling includes the indication.

In some examples, to support transmitting the feedback configuration, the feedback scheduling manager 1125 may be configured as or otherwise support a means for transmitting a downlink control channel that includes the feedback configuration.

In some examples, the downlink transmission manager 1130 may be configured as or otherwise support a means for transmitting a control message that schedules a single downlink shared channel transmission within the feedback occasion, where the feedback configuration indicates the number of feedback bits to provide for the single downlink shared channel transmission.

In some examples, the feedback message manager 1135 may be configured as or otherwise support a means for receiving a set of feedback bits for at least one grant unsuccessfully received at the UE in the feedback message, the set of feedback bits includes a set of zero value bits equal to the number of feedback bits indicated by the feedback configuration.

In some examples, the downlink transmission manager 1130 may be configured as or otherwise support a means for transmitting a grant of the one or more grants, the grant scheduling a number of downlink shared channel transmissions that is less than the number of feedback bits indicated by the feedback configuration. In some examples, the feedback message manager 1135 may be configured as or otherwise support a means for receiving a repetition of at least one bit of a set of feedback bits for the number of downlink shared channel transmissions in the feedback message, the number of downlink shared channel transmissions being less than the number of feedback bits indicated by the feedback configuration.

Figure 12:
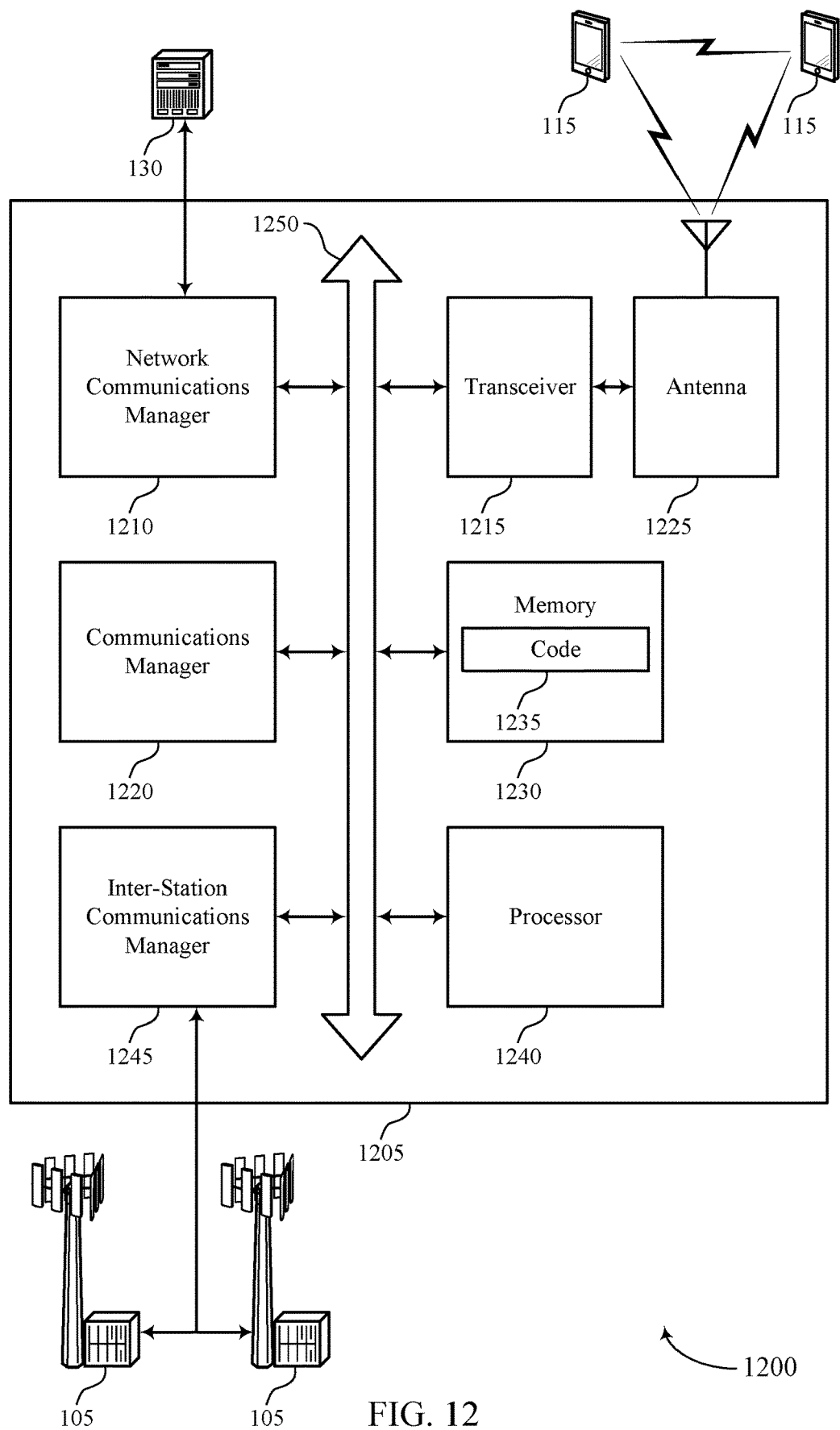
FIG. 12 shows a diagram of a system including a device that supports grant-based feedback bit determination for feedback occasions in accordance with one or more aspects of the present disclosure.

FIG. 12 shows a diagram of a system 1200 including a device 1205 that supports grant-based feedback bit determination for feedback occasions in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting grant-based feedback bit determination for feedback occasions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a feedback configuration indicating a number of feedback bits to provide for each grant within a feedback occasion associated with the UE. The communications manager 1220 may be configured as or otherwise support a means for transmitting, to the UE, one or more grants within the feedback occasion. The communications manager 1220 may be configured as or otherwise support a means for receiving a feedback message that includes a respective set of bits for each respective grant of the one or more grants within the feedback occasion, each respective set of bits having a number of bits corresponding to the number of feedback bits indicated by the feedback configuration.

By including or configuring the communications manager 1220 in accordance with examples as described herein, the device 1205 may support techniques for a base station to transmit a feedback configuration to a UE indicating a number of feedback bits for each grant in a feedback occasion, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of grant-based feedback bit determination for feedback occasions as described herein, or the processor 1240 and the memory 1230 may be otherwise configured to perform or support such operations.

Figure 13:
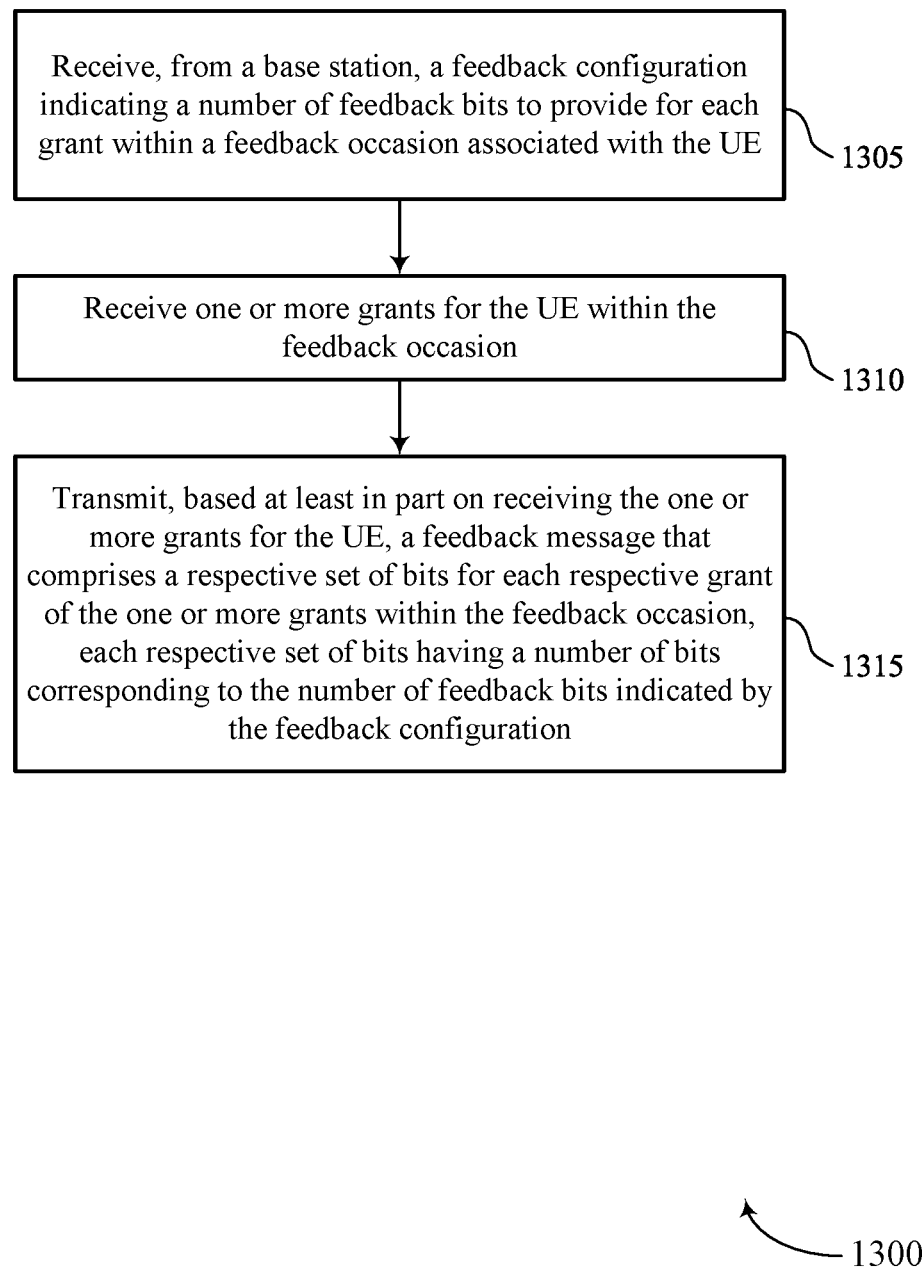
FIGS. 13 through 17 show flowcharts illustrating methods that support grant-based feedback bit determination for feedback occasions in accordance with one or more aspects of the present disclosure.

FIG. 13 shows a flowchart illustrating a method 1300 that supports grant-based feedback bit determination for feedback occasions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a feedback configuration indicating a number of feedback bits to provide for each grant within a feedback occasion associated with the UE. The operations of 1305 may be performed in accordance with examples as disclosed herein. In some examples, aspects of the operations of 1305 may be performed by a feedback scheduling component 725 as described with reference to FIG. 7.

At 1310, the method may include receiving one or more grants for the UE within the feedback occasion. The operations of 1310 may be performed in accordance with examples as disclosed herein. In some examples, aspects of the operations of 1310 may be performed by a downlink transmission component 730 as described with reference to FIG. 7.

At 1315, the method may include transmitting, based on receiving the one or more grants for the UE, a feedback message that includes a respective set of bits for each respective grant of the one or more grants within the feedback occasion, each respective set of bits having a number of bits corresponding to the number of feedback bits indicated by the feedback configuration. The operations of 1315 may be performed in accordance with examples as disclosed herein. In some examples, aspects of the operations of 1315 may be performed by a feedback message component 735 as described with reference to FIG. 7.

Figure 14:
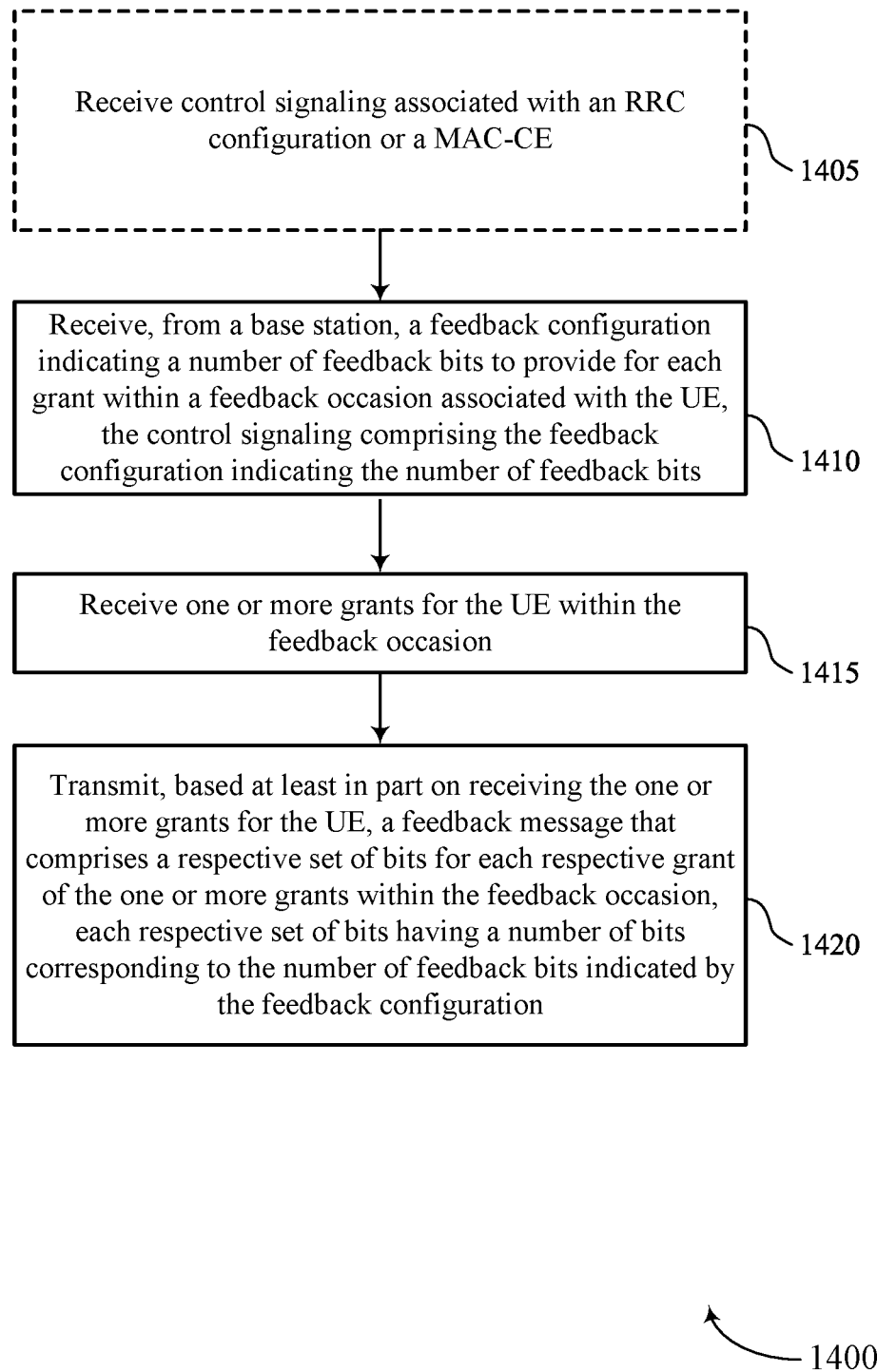

FIG. 14 shows a flowchart illustrating a method 1400 that supports grant-based feedback bit determination for feedback occasions in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling associated with an RRC configuration or a MAC-CE. The operations of 1405 may be performed in accordance with examples as disclosed herein. In some examples, aspects of the operations of 1405 may be performed by a feedback scheduling component 725 as described with reference to FIG. 7.

At 1410, the method may include receiving, from a base station, a feedback configuration indicating a number of feedback bits to provide for each grant within a feedback occasion associated with the UE, the control signaling including the feedback configuration indicating the number of feedback bits. The operations of 1410 may be performed in accordance with examples as disclosed herein. In some examples, aspects of the operations of 1410 may be performed by a feedback scheduling component 725 as described with reference to FIG. 7.

At 1415, the method may include receiving one or more grants for the UE within the feedback occasion. The operations of 1415 may be performed in accordance with examples as disclosed herein. In some examples, aspects of the operations of 1415 may be performed by a downlink transmission component 730 as described with reference to FIG. 7.

At 1420, the method may include transmitting, based on receiving the one or more grants for the UE, a feedback message that includes a respective set of bits for each respective grant of the one or more grants within the feedback occasion, each respective set of bits having a number of bits corresponding to the number of feedback bits indicated by the feedback configuration. The operations of 1420 may be performed in accordance with examples as disclosed herein. In some examples, aspects of the operations of 1420 may be performed by a feedback message component 735 as described with reference to FIG. 7.

Figure 15:
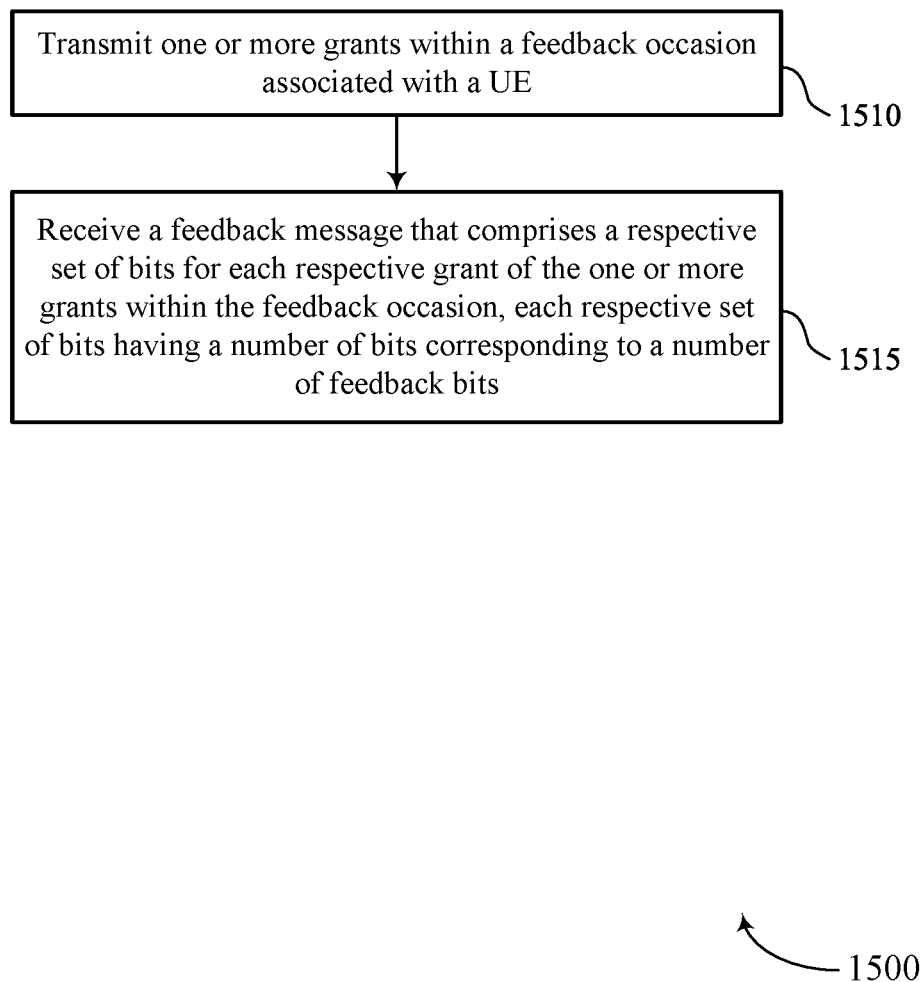

FIG. 15 shows a flowchart illustrating a method 1500 that supports grant-based feedback bit determination for feedback occasions in accordance with one or more aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1510, the method may include transmitting one or more grants within a feedback occasion associated with a UE. The operations of 1510 may be performed in accordance with examples as disclosed herein. In some examples, aspects of the operations of 1510 may be performed by a downlink transmission manager 1130 as described with reference to FIG. 11.

At 1515, the method may include receiving a feedback message that includes a respective set of bits for each respective grant of the one or more grants within the feedback occasion, each respective set of bits having a number of bits corresponding to a number of feedback bits. The operations of 1515 may be performed in accordance with examples as disclosed herein. In some examples, aspects of the operations of 1515 may be performed by a feedback message manager 1135 as described with reference to FIG. 11.

Figure 16:
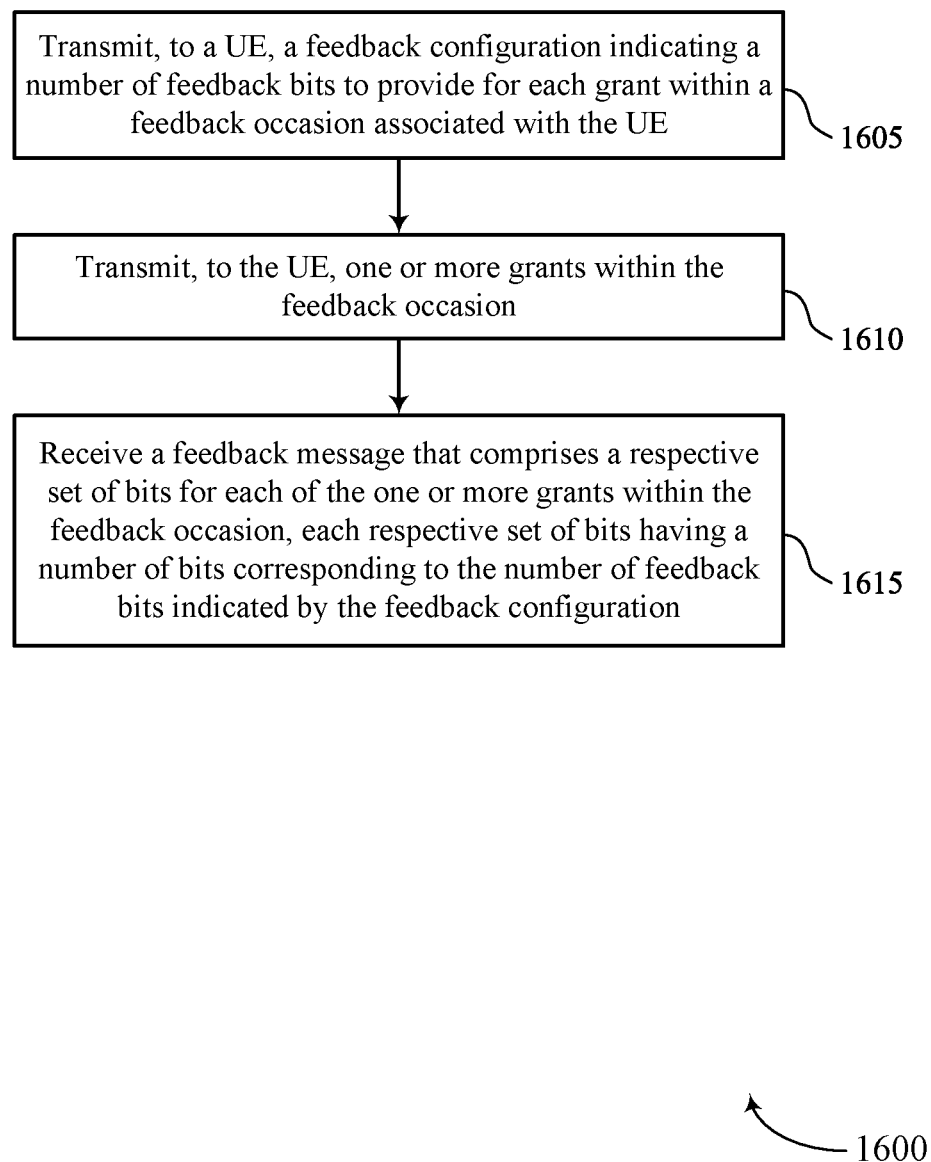

FIG. 16 shows a flowchart illustrating a method 1600 that supports grant-based feedback bit determination for feedback occasions in accordance with one or more aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a feedback configuration indicating a number of feedback bits to provide for each grant within a feedback occasion associated with the UE. The operations of 1605 may be performed in accordance with examples as disclosed herein. In some examples, aspects of the operations of 1605 may be performed by a feedback scheduling manager 1125 as described with reference to FIG. 11.

At 1610, the method may include transmitting, to the UE, one or more grants within the feedback occasion. The operations of 1610 may be performed in accordance with examples as disclosed herein. In some examples, aspects of the operations of 1610 may be performed by a downlink transmission manager 1130 as described with reference to FIG. 11.

At 1615, the method may include receiving a feedback message that includes a respective set of bits for each of the one or more grants within the feedback occasion, each respective set of bits having a number of bits corresponding to the number of feedback bits indicated by the feedback configuration. The operations of 115 may be performed in accordance with examples as disclosed herein. In some examples, aspects of the operations of 1615 may be performed by a feedback message manager 1135 as described with reference to FIG. 11.

Figure 17:
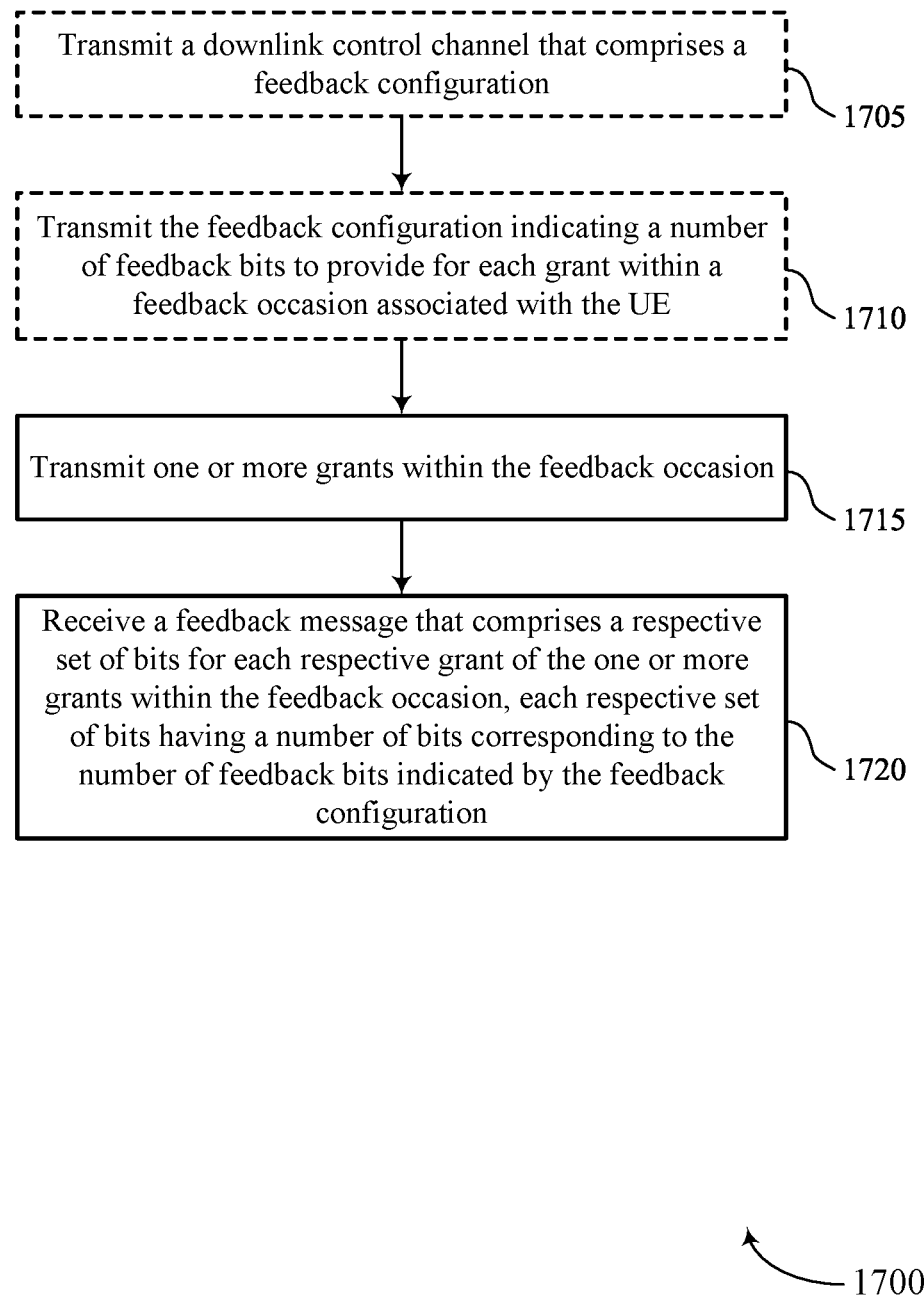

FIG. 17 shows a flowchart illustrating a method 1700 that supports grant-based feedback bit determination for feedback occasions in accordance with one or more aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting a downlink control channel, which may include a DCI message, that includes a feedback configuration. The operations of 1705 may be performed in accordance with examples as disclosed herein. In some examples, aspects of the operations of 1705 may be performed by a feedback scheduling manager 1125 as described with reference to FIG. 11.

At 1710, the method may include transmitting the feedback configuration indicating a number of feedback bits to provide for each grant within a feedback occasion associated with the UE. The operations of 1710 may be performed in accordance with examples as disclosed herein. In some examples, aspects of the operations of 1710 may be performed by a feedback scheduling manager 1125 as described with reference to FIG. 11.

At 1715, the method may include transmitting one or more grants within the feedback occasion. The operations of 1715 may be performed in accordance with examples as disclosed herein. In some examples, aspects of the operations of 1715 may be performed by a downlink transmission manager 1130 as described with reference to FIG. 11.

At 1720, the method may include receiving a feedback message that includes a respective set of bits for each respective grant of the one or more grants within the feedback occasion, each respective set of bits having a number of bits corresponding to the number of feedback bits indicated by the feedback configuration. The operations of 1720 may be performed in accordance with examples as disclosed herein. In some examples, aspects of the operations of 1720 may be performed by a feedback message manager 1135 as described with reference to FIG. 11.

The following provides an overview of aspects of the present disclosure:

Aspect 1: A method for wireless communications at a UE, comprising: receiving, from a network device, a feedback configuration indicating a number of feedback bits to provide for each grant within a feedback occasion associated with the UE; receiving one or more grants for the UE within the feedback occasion; and transmitting, based at least in part on the receiving the one or more grants for the UE, a feedback message that comprises a respective set of bits for each respective grant of the one or more grants within the feedback occasion, each respective set of bits having a number of bits corresponding to the number of feedback bits indicated by the feedback configuration.

Aspect 2: The method of aspect 1, the receiving the feedback configuration comprises: receiving control signaling associated with a radio resource control configuration or a medium access control-control element, the control signaling comprising the feedback configuration indicating the number of feedback bits.

Aspect 3: The method of aspect 2, further comprising: monitoring for a number of downlink shared channel transmissions scheduled by a grant of the one or more grants, wherein the number of downlink shared channel transmissions is less than the number of feedback bits to provide for the each grant, wherein the feedback message comprises a set of bits including a first set of feedback bits for the number of downlink shared channel transmissions and one or more zero value bits.

Aspect 4: The method of aspect 3, further comprising: refraining from using one or more codebooks corresponding to the number of downlink shared channel transmissions based at least in part on a first size of a first feedback codebook corresponding to the set of bits for the grant being equal to a second size of a second feedback codebook corresponding to a second set of bits for a second grant.

Aspect 5: The method of any of aspects 2 through 4, further comprising: monitoring for a number of downlink shared channel transmissions scheduled by a grant of the one or more grants, wherein the number of downlink shared channel transmissions is greater than the number of feedback bits to provide for the each grant; and bundling one or more feedback bits associated with the number of downlink shared channel transmissions according to a bundling pattern, wherein the feedback message comprises the bundled one or more feedback bits.

Aspect 6: The method of aspect 5, further comprising: receiving an indication of the bundling pattern, wherein the control signaling comprises the indication.

Aspect 7: The method of any of aspects 1 through 6, the receiving the feedback configuration comprises: receiving a downlink control channel that comprises the feedback configuration.

Aspect 8: The method of aspect 1, further comprising: receiving a control message that schedules a single downlink shared channel transmission within the feedback occasion, wherein the feedback configuration indicates the number of feedback bits to provide for the single downlink shared channel transmission.

Aspect 9: The method of aspect 8, wherein the number of feedback bits to provide for the each grant within the feedback occasion associated with the UE indicated in the feedback configuration is based at least in part on a first size of a first feedback codebook being equal to a second size of a second feedback codebook.

Aspect 10: The method of any of aspects 1 through 9, further comprising: receiving a grant of the one or more grants, the grant indicating that at least one grant has been unsuccessfully received at the UE; and transmitting a set of feedback bits for the at least one grant in the feedback message, the set of feedback bits comprises a set of zero value bits equal to the number of feedback bits indicated by the feedback configuration.

Aspect 11: The method of any of aspects 1 through 10, further comprising: receiving a grant of the one or more grants, the grant scheduling a number of downlink shared channel transmissions that is less than the number of feedback bits indicated by the feedback configuration; repeating at least one bit of a set of feedback bits for the number of downlink shared channel transmissions in the feedback message the number of downlink shared channel transmissions being less than the number of feedback bits indicated by the feedback configuration.

Aspect 12: The method of any of aspects 1 through 11, wherein the number of feedback bits is different from a second number of feedback bits to provide for the each grant within a second feedback occasion associated with the UE.

Aspect 13: A method for wireless communications at a network device, comprising: transmitting one or more grants within a feedback occasion associated with a user equipment (UE); and receiving a feedback message that comprises a respective set of bits for each respective grant of the one or more grants within the feedback occasion, each respective set of bits having a number of bits corresponding to a number of feedback bits.

Aspect 14: The method of aspect 13, further comprising: transmitting a feedback configuration indicating the number of feedback bits to provide for each grant within the feedback occasion associated with the UE.

Aspect 15: The method of aspect 14, the transmitting the feedback configuration comprises: transmitting control signaling associated with a radio resource control configuration or a medium access control-control element, the control signaling comprising the feedback configuration indicating the number of feedback bits.

Aspect 16: The method of aspect 15, further comprising: transmitting, to the UE, a number of downlink shared channel transmissions scheduled by a grant of the one or more grants, wherein the number of downlink shared channel transmissions is less than the number of feedback bits to provide for the each grant, wherein the feedback message comprises a set of bits including a first set of feedback bits for the number of downlink shared channel transmissions and one or more zero value bits.

Aspect 17: The method of any of aspects 15 through 16, further comprising: transmitting, to the UE, a number of downlink shared channel transmissions scheduled by a grant of the one or more grants, wherein the number of downlink shared channel transmissions is greater than the number of feedback bits to provide for the each grant; and receiving one or more feedback bits associated with the number of downlink shared channel transmissions according to a bundling pattern, wherein the feedback message comprises one or more bundled feedback bits.

Aspect 18: The method of aspect 17, further comprising: transmitting an indication of the bundling pattern, wherein the control signaling comprises the indication.

Aspect 19: The method of aspect 14, the transmitting the feedback configuration comprises: transmitting a downlink control channel that comprises the feedback configuration.

Aspect 20: The method of any of aspects 13 through 19, further comprising: transmitting a control message that schedules a single downlink shared channel transmission within the feedback occasion, wherein the feedback configuration indicates the number of feedback bits to provide for the single downlink shared channel transmission.

Aspect 21: The method of any of aspects 13 through 20, further comprising: receiving a set of feedback bits for at least one grant unsuccessfully received at the UE in the feedback message, the set of feedback bits comprises a set of zero value bits equal to the number of feedback bits indicated by the feedback configuration.

Aspect 22: The method of any of aspects 13 through 21, further comprising: transmitting a grant of the one or more grants, the grant scheduling a number of downlink shared channel transmissions that is less than the number of feedback bits indicated by the feedback configuration; receiving a repetition of at least one bit of a set of feedback bits for the number of downlink shared channel transmissions in the feedback message, the number of downlink shared channel transmissions being less than the number of feedback bits indicated by the feedback configuration.

Aspect 23: An apparatus for wireless communications at a UE, comprising a processor; and memory coupled with the processor, the processor configured to perform a method of any of aspects 1 through 12.

Aspect 24: An apparatus for wireless communications at a UE, comprising at least one means for performing a method of any of aspects 1 through 12.

Aspect 25: A non-transitory computer-readable medium storing code for wireless communications at a UE, the code comprising instructions executable by a processor to perform a method of any of aspects 1 through 12.

Aspect 26: An apparatus for wireless communications at a base station, comprising a processor; and memory coupled with the processor, the processor configured to perform a method of any of aspects 13 through 22.

Aspect 27: An apparatus for wireless communications at a base station, comprising at least one means for performing a method of any of aspects 13 through 22.

Aspect 28: A non-transitory computer-readable medium storing code for wireless communications at a base station, the code comprising instructions executable by a processor to perform a method of any of aspects 13 through 22.

Aspect 29: A method for wireless communications at a UE, comprising: receiving, from a base station, a feedback configuration indicating a number of feedback bits to provide for each grant within a feedback occasion associated with the UE; receiving one or more grants for the UE within the feedback occasion; and transmitting, based at least in part on receiving the one or more grants for the UE, a feedback message that comprises a respective set of bits for each of the one or more grants within the feedback occasion, each respective set of bits having a number of bits corresponding to the number of feedback bits indicated by the feedback configuration.

Aspect 30: The method of aspect 29, the transmitting the feedback configuration comprises: transmitting control signaling associated with a radio resource control configuration or a medium access control-control element, the control signaling comprising the feedback configuration indicating the number of feedback bits.

Aspect 31: The method of aspect 30, further comprising: transmitting, to the UE, a number of downlink shared channel transmissions scheduled by a grant of the one or more grants, wherein the number of downlink shared channel transmissions is less than the number of feedback bits to provide for the each grant, wherein the feedback message comprises a set of bits including a first set of feedback bits for the number of downlink shared channel transmissions and one or more zero value bits.

Aspect 32: The method of any of aspects 30 through 31, further comprising: transmitting, to the UE, a number of downlink shared channel transmissions scheduled by a grant of the one or more grants, wherein the number of downlink shared channel transmissions is greater than the number of feedback bits to provide for the each grant; and receiving one or more feedback bits associated with the number of downlink shared channel transmissions according to a bundling pattern, wherein the feedback message comprises one or more bundled feedback bits.

Aspect 33: The method of aspect 32, further comprising: transmitting an indication of the bundling pattern, wherein the control signaling comprises the indication.

Aspect 34: The method of aspect 29, the transmitting the feedback configuration comprises: transmitting a downlink control channel that comprises the feedback configuration.

Aspect 35: The method of any of aspects 29 through 34, further comprising: transmitting a control message that schedules a single downlink shared channel transmission within the feedback occasion, wherein the feedback configuration indicates the number of feedback bits to provide for the single downlink shared channel transmission.

Aspect 36: The method of any of aspects 29 through 37, further comprising: receiving a set of feedback bits for at least one grant unsuccessfully received at the UE in the feedback message, the set of feedback bits comprises a set of zero value bits equal to the number of feedback bits indicated by the feedback configuration.

Aspect 37: The method of any of aspects 29 through 36, further comprising: transmitting a grant of the one or more grants, the grant scheduling a number of downlink shared channel transmissions that is less than the number of feedback bits indicated by the feedback configuration; receiving a repetition of at least one bit of a set of feedback bits for the number of downlink shared channel transmissions in the feedback message, the number of downlink shared channel transmissions being less than the number of feedback bits indicated by the feedback configuration.

Aspect 38: An apparatus for wireless communications at a UE, comprising a processor; and memory coupled with the processor, the processor configured to perform a method of any of aspects 29 through 37.

Aspect 38: An apparatus for wireless communications at a UE, comprising at least one means for performing a method of any of aspects 29 through 37.

Aspect 39: A non-transitory computer-readable medium storing code for wireless communications at a UE, the code comprising instructions executable by a processor to perform a method of any of aspects 29 through 37.

Aspect 40: A method for wireless communications at a base station, comprising: transmitting, to a UE, a feedback configuration indicating a number of feedback bits to provide for each grant within a feedback occasion associated with the UE; transmitting, to the UE, one or more grants within the feedback occasion; and receiving a feedback message that comprises a respective set of bits for each of the one or more grants within the feedback occasion, each respective set of bits having a number of bits corresponding to the number of feedback bits indicated by the feedback configuration.

Aspect 41: The method of aspect 40, the transmitting the feedback configuration comprises: transmitting control signaling associated with a radio resource control configuration or a medium access control-control element, the control signaling comprising the feedback configuration indicating the number of feedback bits.

Aspect 42: The method of aspect 41, further comprising: transmitting, to the UE, a number of downlink shared channel transmissions scheduled by a grant of the one or more grants, wherein the number of downlink shared channel transmissions is less than the number of feedback bits to provide for the each grant, wherein the feedback message comprises a set of bits including a first set of feedback bits for the number of downlink shared channel transmissions and one or more zero value bits.

Aspect 43: The method of any of aspects 40 through 41, further comprising: transmitting, to the UE, a number of downlink shared channel transmissions scheduled by a grant of the one or more grants, wherein the number of downlink shared channel transmissions is greater than the number of feedback bits to provide for the each grant; and receiving one or more feedback bits associated with the number of downlink shared channel transmissions according to a bundling pattern, wherein the feedback message comprises one or more bundled feedback bits.

Aspect 44: The method of aspect 43, further comprising: transmitting an indication of the bundling pattern, wherein the control signaling comprises the indication.

Aspect 45: The method of aspect 40, the transmitting the feedback configuration comprises: transmitting a downlink control channel that comprises the feedback configuration.

Aspect 46: The method of any of aspects 40 through 45, further comprising: transmitting a control message that schedules a single downlink shared channel transmission within the feedback occasion, wherein the feedback configuration indicates the number of feedback bits to provide for the single downlink shared channel transmission.

Aspect 47: The method of any of aspects 40 through 46, further comprising: receiving a set of feedback bits for at least one grant unsuccessfully received at the UE in the feedback message, the set of feedback bits comprises a set of zero value bits equal to the number of feedback bits indicated by the feedback configuration.

Aspect 48: The method of any of aspects 40 through 47, further comprising: transmitting a grant of the one or more grants, the grant scheduling a number of downlink shared channel transmissions that is less than the number of feedback bits indicated by the feedback configuration; receiving a repetition of at least one bit of a set of feedback bits for the number of downlink shared channel transmissions in the feedback message, the number of downlink shared channel transmissions being less than the number of feedback bits indicated by the feedback configuration.

Aspect 49: An apparatus for wireless communications at a base station, comprising a processor; and memory coupled with the processor, the processor configured to perform a method of any of aspects 40 through 48.

Aspect 50: An apparatus for wireless communications at a base station, comprising at least one means for performing a method of any of aspects 40 through 48.

Aspect 51: A non-transitory computer-readable medium storing code for wireless communications at a base station, the code comprising instructions executable by a processor to perform a method of any of aspects 40 through 48.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor; and
   memory coupled with the processor, the processor configured to:

receive, from a network device, a feedback configuration indicating a quantity of feedback bits to provide for each grant within a feedback occasion associated with the UE;
receive a plurality of grants for the UE within the feedback occasion; and
transmit, based at least in part on the plurality of grants for the UE, a feedback message that comprises a respective set of bits for each respective grant of the plurality of grants within the feedback occasion, each respective set of bits having a quantity of bits corresponding to the quantity of feedback bits indicated by the feedback configuration.

2. The apparatus of claim 1, further comprising:
an antenna panel, wherein the processor and the antenna panel are configured to:
receive control signaling associated with a radio resource control configuration or a medium access control-control element (MAC-CE), the control signaling comprising the feedback configuration indicating the quantity of feedback bits.

3. The apparatus of claim 2, wherein the processor is further configured to:
monitor for a quantity of downlink shared channel transmissions scheduled by a grant of the plurality of grants, wherein the quantity of downlink shared channel transmissions is less than the quantity of feedback bits to provide for each grant, wherein the feedback message comprises a set of bits including a first set of feedback bits for the quantity of downlink shared channel transmissions and one or more zero value bits.

4. The apparatus of claim 3, wherein the processor is further configured to:
refrain from using one or more codebooks corresponding to the quantity of downlink shared channel transmissions based at least in part on a first size of a first feedback codebook corresponding to the set of bits for the grant being equal to a second size of a second feedback codebook corresponding to a second set of bits for a second grant.

5. The apparatus of claim 2, wherein the processor is further configured to:
monitor for a quantity of downlink shared channel transmissions scheduled by a grant of the plurality of grants, wherein the quantity of downlink shared channel transmissions is greater than the quantity of feedback bits to provide for each grant; and
bundle one or more feedback bits associated with the quantity of downlink shared channel transmissions according to a bundling pattern, wherein the feedback message comprises the bundled one or more feedback bits.

6. The apparatus of claim 5, wherein the processor is further configured to:
receive an indication of the bundling pattern, wherein the control signaling comprises the indication.

7. The apparatus of claim 1, wherein, to receive the feedback configuration, the processor is configured to:
receive a downlink control channel that comprises the feedback configuration.

8. The apparatus of claim 1, wherein the processor is further configured to:
receive a control message that schedules a single downlink shared channel transmission within the feedback occasion, wherein the feedback configuration indicates the quantity of feedback bits to provide for the single downlink shared channel transmission.

9. The apparatus of claim 8, wherein the quantity of feedback bits to provide for each grant within the feedback occasion associated with the UE indicated in the feedback configuration is based at least in part on a first size of a first feedback codebook being equal to a second size of a second feedback codebook.

10. The apparatus of claim 1, wherein the processor is further configured to:
receive a grant of the plurality of grants, the grant indicating that at least one grant has been unsuccessfully received at the UE; and
transmit a set of feedback bits for the at least one grant in the feedback message, the set of feedback bits comprises a set of zero value bits equal to the quantity of feedback bits indicated by the feedback configuration.

11. The apparatus of claim 1, wherein the processor is further configured to:
receive a grant of the plurality of grants, the grant scheduling a quantity of downlink shared channel transmissions that is less than the quantity of feedback bits indicated by the feedback configuration; and
repeat at least one bit of a set of feedback bits for the quantity of downlink shared channel transmissions in the feedback message, the quantity of downlink shared channel transmissions being less than the quantity of feedback bits indicated by the feedback configuration.

12. The apparatus of claim 1, wherein the quantity of feedback bits is different from a second quantity of feedback bits to provide for each grant within a second feedback occasion associated with the UE.

13. An apparatus for wireless communications at a network device, comprising:
a processor; and
memory coupled with the processor, the processor configured to:
transmit a plurality of grants within a feedback occasion associated with a user equipment (UE); and
receive a feedback message that comprises a respective set of bits for each respective grant of the plurality of grants within the feedback occasion, each respective set of bits having a quantity of bits corresponding to a quantity of feedback bits.

14. The apparatus of claim 13, further comprising:
an antenna panel, wherein the processor and the antenna panel are configured to:
transmit a feedback configuration indicating the quantity of feedback bits to provide for each grant within the feedback occasion.

15. The apparatus of claim 14, wherein, to transmit the feedback configuration, the processor is configured to:
transmit control signaling associated with a radio resource control configuration or a medium access control-control element, the control signaling comprising the feedback configuration indicating the quantity of feedback bits.

16. The apparatus of claim 15, wherein the processor is further configured to:
transmit a quantity of downlink shared channel transmissions scheduled by a grant of the plurality of grants, wherein the quantity of downlink shared channel transmissions is less than the quantity of feedback bits to provide for each grant, wherein the feedback message comprises a set of bits including a first set of feedback bits for the quantity of downlink shared channel transmissions and one or more zero value bits.

17. The apparatus of claim 15, wherein the processor is further configured to:

transmit a quantity of downlink shared channel transmissions scheduled by a grant of the plurality of grants, wherein the quantity of downlink shared channel transmissions is greater than the quantity of feedback bits to provide for each grant; and receive one or more feedback bits associated with the quantity of downlink shared channel transmissions according to a bundling pattern, wherein the feedback message comprises one or more bundled feedback bits.

18. The apparatus of claim 17, wherein the processor is further configured to:

transmit an indication of the bundling pattern, wherein the control signaling comprises the indication.

19. The apparatus of claim 14, wherein, to transmit the feedback configuration, the processor is configured to:

transmit a downlink control channel that comprises the feedback configuration.

20. The apparatus of claim 14, wherein the processor is further configured to:

transmit a control message that schedules a single downlink shared channel transmission within the feedback occasion, wherein the feedback configuration indicates the quantity of feedback bits to provide for the single downlink shared channel transmission.

21. The apparatus of claim 14, wherein the processor is further configured to:

receive a set of feedback bits for at least one grant unsuccessfully received at the UE in the feedback message, the set of feedback bits comprises a set of zero value bits equal to the quantity of feedback bits indicated by the feedback configuration.

22. The apparatus of claim 14, wherein the processor is further configured to:

transmit a grant of the plurality of grants, the grant scheduling a quantity of downlink shared channel transmissions that is less than the quantity of feedback bits indicated by the feedback configuration; and receive a repetition of at least one bit of a set of feedback bits for the quantity of downlink shared channel transmissions in the feedback message, the quantity of downlink shared channel transmissions being less than the quantity of feedback bits indicated by the feedback configuration.

23. A method for wireless communications at a user equipment (UE), comprising:

receiving, from a network device, a feedback configuration indicating a quantity of feedback bits to provide for each grant within a feedback occasion associated with the UE;

receiving a plurality of grants for the UE within the feedback occasion; and transmitting, based at least in part on receiving the plurality of grants for the UE, a feedback message that comprises a respective set of bits for each respective grant of the plurality of grants within the feedback occasion, each respective set of bits having a quantity of bits corresponding to the quantity of feedback bits indicated by the feedback configuration.

24. The method of claim 23, wherein receiving the feedback configuration comprises:

receiving control signaling associated with a radio resource control configuration or a medium access control-control element, the control signaling comprising the feedback configuration indicating the quantity of feedback bits.

25. The method of claim 24, further comprising:

monitoring for a quantity of downlink shared channel transmissions scheduled by a grant of the plurality of grants, wherein the quantity of downlink shared channel transmissions is less than the quantity of feedback bits to provide for each grant, wherein the feedback message comprises a set of bits including a first set of feedback bits for the quantity of downlink shared channel transmissions and one or more zero value bits.

26. The method of claim 24, further comprising:

monitoring for a quantity of downlink shared channel transmissions scheduled by a grant of the plurality of grants, wherein the quantity of downlink shared channel transmissions is greater than the quantity of feedback bits to provide for each grant; and bundling one or more feedback bits associated with the quantity of downlink shared channel transmissions according to a bundling pattern, wherein the feedback message comprises the bundled one or more feedback bits.

27. The method of claim 23, wherein receiving the feedback configuration comprises:

receiving a downlink control channel that comprises the feedback configuration.

28. The method of claim 23, further comprising:

receiving a control message that schedules a single downlink shared channel transmission within the feedback occasion, wherein the feedback configuration indicates the quantity of feedback bits to provide for the single downlink shared channel transmission.

29. A method for wireless communications at a network device, comprising:

transmitting a plurality of grants within a feedback occasion associated with a user equipment (UE); and receiving a feedback message that comprises a respective set of bits for each respective grant of the plurality of grants within the feedback occasion, each respective set of bits having a quantity of bits corresponding to a quantity of feedback bits.

30. The method of claim 29, further comprising:

transmitting a feedback configuration indicating the quantity of feedback bits to provide for each grant within the feedback occasion.

* * * * *